United States Patent [19]
Sawahata et al.

[11] Patent Number: 6,043,736
[45] Date of Patent: Mar. 28, 2000

[54] WEIGHING APPARATUS, APPARATUS FOR DETECTING AUXILIARY-SEAT MOUNTING DIRECTION, PERSON-ON-BOARD PROTECTING APPARATUS, AND APPARATUS FOR GIVING WARNING ABOUT SEATING CONDITION

[75] Inventors: Toshikazu Sawahata; Yoichi Hashimoto; Shinichiro Tsurushima, all of Saitama, Japan

[73] Assignee: Kansei Corporation, Saitama, Japan

[21] Appl. No.: 09/028,915

[22] Filed: Feb. 24, 1998

[30] Foreign Application Priority Data

| Feb. 24, 1997 | [JP] | Japan | 9-055568 |
| Feb. 24, 1997 | [JP] | Japan | 9-055569 |
| Feb. 24, 1997 | [JP] | Japan | 9-055570 |
| Feb. 24, 1997 | [JP] | Japan | 9-055571 |
| Feb. 24, 1997 | [JP] | Japan | 9-055572 |
| Feb. 24, 1997 | [JP] | Japan | 9-055573 |

[51] Int. Cl.$^7$ .................................................. G08B 13/14
[52] U.S. Cl. ...................... 340/438; 340/573.1; 340/667; 280/735; 701/45; 701/47
[58] Field of Search ................ 340/438, 665–669, 340/436, 573.1; 280/732, 735; 701/45, 47; 307/10.1; 180/268, 271

[56] References Cited

U.S. PATENT DOCUMENTS

| 5,787,377 | 7/1998 | Watanabe et al. | 701/45 |
| 5,802,479 | 9/1998 | Kithill et al. | 701/45 |
| 5,848,802 | 12/1998 | Breed et al. | 280/735 |
| 5,857,699 | 1/1999 | Rink et al. | 280/737 |
| 5,884,939 | 3/1999 | Yamaji et al. | 280/743.1 |

*Primary Examiner*—Daniel J. Wu
*Attorney, Agent, or Firm*—Sughrue, Mion, Zinn Macpeak & Seas, PLLC

[57] ABSTRACT

A person-on-board protecting apparatus having ignition timing estimating means for outputting an ignition signal by determining a collision on the basis of an output from an acceleration sensor and estimating timing at which the head of a person on board reaches a predetermined position, expansion rate control means for outputting a control signal for controlling the expansion force of an air bag according to the head position of the person on board from a forward predetermined reference position, and an inflator having a plurality of detonators. The ignition modes of the plurality of detonators provided for the inflator are controlled according to an ignition signal from the ignition timing estimating means and a control signal from expansion force control means, so that the expansion rate and timing of the air bag are controlled.

23 Claims, 22 Drawing Sheets

FIG. 26

DISTANCE BETWEEN PASSENGER AND AIR BAG

← FAR            CLOSE →

| OUTPUT TERMINAL | 1 | 2 | 3 | 4 | 5 | 6 | 7 | 8 | 9 | 10 |
|---|---|---|---|---|---|---|---|---|---|---|
| A | 1 | 0 | 1 | 0 | 1 | 0 | 1 | 1 | 1 | 1 |
| B | 0 | 1 | 1 | 0 | 0 | 1 | 1 | 1 | 1 | 1 |
| C | 0 | 0 | 0 | 1 | 1 | 1 | 1 | 1 | 1 | 1 |
| D | 0 | 0 | 0 | 0 | 0 | 0 | 0 | 1 | 0 | 0 |
| E | 0 | 0 | 0 | 0 | 0 | 0 | 0 | 0 | 1 | 0 |
| F | 0 | 0 | 0 | 0 | 0 | 0 | 0 | 0 | 0 | 1 |

AIR-BAG CONTROL CONTENTS

L1: IGNITION TIMING CONTROL INFLATION SPEED: HIGH

L2: DELAY CONTROL INFLATION SPEED: MEDIUM

L3: DELAY CONTROL INFLATION SPEED: LOW

L4: ONLY ONE INFLATION CONTROL

WEIGHING APPARATUS, APPARATUS FOR DETECTING AUXILIARY-SEAT MOUNTING DIRECTION, PERSON-ON-BOARD PROTECTING APPARATUS, AND APPARATUS FOR GIVING WARNING ABOUT SEATING CONDITION

BACKGROUND OF THE INVENTION

1. Field of the Invention

The present invention relates to a weighing apparatus for use in determining whether to activate an air bag system intended for a passenger seat in order to protect a person in a vehicle, for example, from a collision accident, and to more particularly to a weighing apparatus for weighing a person on board from internal pressure in air bags adapted to receive the weight of the person. Also, the present invention relates to an apparatus for detecting an auxiliary-seat mounting direction in order to determine whether an auxiliary-seat such as a child seat for protecting a child from a vehicle accident in forward- or backward-turned when the auxiliary seat is mounted on a passenger seat. Further, the present invention relates to a person-on-board protecting apparatus capable of controlling the expansion force (or expansion rate) of an air bag or the like in accordance with the seating condition of a person on board. Still further, the present invention relates to an apparatus for giving a warning about a seating condition when the seating condition of a person on board is bad in order to inflate an air bag effectively. Yet still further, the present invention relates to an apparatus for detecting the presence of a person on board, for example, a child standing without sitting on a seat during traveling or a so-called standing child.

2. Description of the Related Art

A weighing apparatus similar in type to the captioned apparatus has been designed to weigh a person sitting on a seat from the output voltage of a plurality of piezoelectric elements provided in the form of a sheet for the seat, for example, a passenger seat.

However, such a weighing apparatus is installed on the seat and the person on board is to sit directly on the seat. Consequently, it is difficult to protect the elements from external force and the problem is that the elements are easily damaged. When the sheet and connectors are electrically connected, moreover, the connectors are exposed outside and have to be protected without spoiling the external appearance and causing connection failure.

A person-on-board restraining system of a type similar to the captioned apparatus for detecting the weight of a person on board who is sitting on a seat has been described in, for example, Japanese Patent Laid-Open No. 186880/1995 Publication. Such a system will be described first by reference to FIGS. 15–16.

When a person on board sits on the seat portion 202 of a seat 201, a weighing sensor 203 using a plurality of strain meters 203a embedded within the seat 201 weighs the person, and a signal indicating the detected weight is supplied to a control unit 204. The control unit 204 is also supplied with a signal resulting from the detection of the reclining angle of the back portion 205 of the seat 201 by means of an angle sensor 206. The signal supplied from the weighing sensor 203 is corrected by the signal detected by the angle sensor 206 in the control unit 204, so that the actual weight of the person on board who is sitting on the seat. When it is judged that no person on board is sitting on the seat, the control unit 204 will supply no ignition current to a detonator 207. Consequently, an inflator 208 does not operate and an air bag 209 is prevented from becoming inflated as shown by reference numeral 210.

If the control unit 204 decides that the person on board is sitting on the seat 201 according to the signals from the weighing sensor 203 and the angle sensor 206, it determines the magnitude of collision according to an acceleration signal indicating an outbreak of such collision when the acceleration signal is supplied from a collision sensor 211. If the control unit 204 determines that the collision is serious, it supplies an ignition current to the detonator 207 to inflate the inflated condition 210 as shown by reference numeral 210 by activating the inflator 208 s0 as to protect the person on board. In FIG. 15, reference numeral 212 denotes a vehicle; and 213, an instrument panel. The detonator 207, the inflator 208, the air bag 209 and the like in the form of a unit are mounted in this instrument panel 213.

However, in the conventional apparatus for detecting the weight of a person sitting on a seat, because the weight sensor is provided only for the seat portion of the seat, the signal from the weighing sensor is corrected by an angle signal from the angle sensor that detects the reclining angle of the back portion of the seat. However, since a weight applied to the back portion 205 cannot be detected, there is a limit of correcting the signal from the weighing sensor, resulting in a problem that it is difficult to readily obtain a desired accuracy.

Referring to FIGS. 21–24, there is illustrated a conventional apparatus for detecting an auxiliary-seat mounting direction of the sort mentioned above.

A pair of antennas 303a, 303b which are wound like a coil on a flexible board are embedded in a bilaterally symmetrical position of the seating portion 302a of the seat portion 302 of a seat 301 such as an auxiliary seat, and the pair of antennas 303a, 303b are aued for simultaneously transmission and reception. Further, a pair of code generators 306, 307 (e.g., Transponder of Texas Instrument Co. (trade name)) are embedded in a position corresponding to the mounting position of the pair of antennas 303a, 303b in the seat portion 305a of an auxiliary seat 304 such as a child seat.

The pair of code generators 306, 307 are electromagnetically coupled to only the antenna 303a or 303b positioned right under the pair of code generators 306, 307. More specifically, as shown in FIG. 21, the antenna 303a is positioned right under the code generator 306 on one side and the antenna 303b is positioned right under the code generator 307 on the other when the auxiliary seat 304 is mounted on the seat 301 so that the back portion 302b of the seat 301 and the back portion 305b of the auxiliary seat 304 face each other. Conversely, as shown in FIG. 24, the antenna 303b is positioned right under the code generator 306 on one side and the antenna 303a is positioned right under the code generator 307 on the other when the auxiliary seat 304 is mounted on the seat 301 so that the back portion 302b of the seat 301 and the back portion 305b of the auxiliary seat 304 are directed in the same direction.

When the back portion 302b of the seat 301 and the back portion 305b of the auxiliary seat 304 positionally face each other, the antenna 303a sends electric power to the code generator 306 on one side by means of an electromagnetic wave and raecives an ID code from the code generator 306, whereas the antenna 303b sends electric power to the code generator 307 on the other by means of an electromagnetic wave and receives an ID code from the code generator 307. When the back portion 302b of the seat 301 and the back portion 305b of the auxiliary seat 304 are otherwise directed in the same direction positionally as shown in FIG. 24, the antenna 303a receives an ID code from the code generator 307 on one side, whereas the antenna 303b receives an ID code from the code generator 306 on the other.

Reference numeral 30B denotes an ID code reading circuit 308 for supplying electric power signals to the pair of antennas 303a, 303b periodically for a predetermined period of time after the power supply is put to work, receiving the ID codes received by the code generators 306, 307, reducing it into a signal which one of the antennas 303a, 303b receives which one of the ID codes so as to supply the resulting signals to a auxiliary-mounting-direction decision circuit 309. The auxiliary-mounting-direction decision circuit 309 determines the direction in which the auxiliary seat 304 is mounted on the seat 301 according to the input signal and sends either inflation permitting or prohibiting signal to an air-bag-inflation decision circuit 311

More specifically, when the back portion 302b of the seat 301 and the back portion 305b of the auxiliary seat 304 positionally face each other an shown in FIG. 23, the auxiliary-mounting-direction decision circuit 309 receives a signal indicating that the antenna 303a is receiving the ID code from the code generator 306 and also receives a signal indicating that the antenna 303b is receiving the ID code from the code generator 307. Consequently, the auxiliary-mounting-direction decision circuit 309 sends the inflation prohibiting signal to the air-bag-inflation decision circuit 311.

When the back portion 302b of the seat 301 and the back portion 305b of the auxiliary seat 304 are otherwise directed in the same direction positionally as shown in FIG. 24, the auxiliary-mounting-direction decision circuit 309 receives a signal indicating that the antenna 303a is receiving the ID code from the code generator 307 and also receives a signal indicating that the antenna 303b is receiving the ID code from the code generator 306. Consequently, the auxiliary-mounting-direction decision circuit 309 sends the inflation permitting signal to the air-bag-inflation decision circuit 311.

When the air-bag-inflation decision circuit 311 determines an outbreak of serious collision according a signal from an acceleration sensor 310 while holding the inflation permitting signal from the auxiliary-mounting-direction decision circuit 309, the air-bag-inflation decision circuit 311 supplies an ignition current via an driving circuit 312 to an air-bag inflation detonator (not shown) incorporated in an air bag unit 313. Thus, an inflator is activated to inflate the air bag, whereby a child sitting on the auxiliary seat 304 is protected.

When the air-bag-inflation decision circuit 311 determines an outbreak of serious collision according the signal from the acceleration sensor 310 while holding the inflation prohibiting signal from the auxiliary-mounting-direction decision circuit 309, the air-bag-inflation decision circuit 311 supplies no ignition current to the air-bag inflation detonator. Thus, the air bag is not inflated and the auxiliary seat 304 is not pushed down from the rear side, so that the child is prevented from being knocked down onto the back portion 302b of the seat 301.

Incidentally, symbol A represents a vehicle; and B an instrument panel.

Notwithstanding, a pair of antennas have to be embedded in the seating portion of a seat in such an apparatus for detecting an auxiliary-seat mounting direction and therefore it is troublesome to mount the pair of antennas therein. Moreover, the external force applied each time a child is seated tends to develop trouble such as the disconnection of the antennas, thus necessitating repairs.

Subsequently, a schematic description will be given of a conventional person-on-board protecting apparatus as disclose in, for example, Japanese Patent Publication No. 519/1996 by reference to FIG. 27.

As shown in FIG. 27, an acceleration signal from an acceleration sensor 401 is converted via a pair of first and second incomplete series integration circuits 402, 403 to a displacement signal, which is supplied to an adder 404. A speed signal from the first incomplete integration circuit 402 is supplied via a second coefficient circuit 406 to the adder 404, and the acceleration signal from the acceleration sensor 401 is supplied via a first coefficient circuit 405 to the adder 404. Consequently, the adder 404 adds up the signals from the second incomplete integration circuit 403, the first coefficient circuit 405 and the second coefficient circuit 406 in order to obtain an estimated displacement quantity of the head of a person on board after the passage of a predetermined time after a collision. Further the adder 404 supplies an estimated displacement quantity to the following comparator 407 and outputs a trigger signal (an ignition signal) when the estimated displacement quantity exceeds a reference value of a control circuit 409. The comparator 407 has a reference value, which is varied by the control circuit 409 supplied with a position signal as switching transistors 410, 411, 412 connected in parallel are subjected to ON control (i.e., the output terminals A, Br C of the control circuit 409 shown in FIG. 4 of Japanese Patent Publication No. 519/1996 are at a high level, that is, "1"). Consequently, the comparator 407 outputs a signal so that the inflation timing of an air bag is hastened when a seat is pushed forward and delayed when the seat in pushed backward.

On the other hand, the acceleration signal from the acceleration sensor 401 is supplied to a collision decision circuit 413 where the-magnitude of the collision is determined. When the collision decision circuit 413 determines the collision to be serious, it outputs a high level signal to an AND gate 414. When the AND gate 414 is supplied with a signal indicating that judging from the comparator 407, the head of the person on board has reached the reference value at this time, further supplies a trigger signal to a detonator 416 via an inflation timing decision circuit, the collision decision circuit 413 and the driving circuit 415.

In this case, the first incomplete integration circuit 402, the second incomplete integration circuit 403, the adder 404, the first coefficient circuit 405 and the second coefficient circuit 406 constitute the inflation timing decision circuit (the section enclosed with a broken line of FIG. 27), which calculates the estimated displacement quantity of the head of the person on board due to a collision after the predetermined time. Further, the reference value of the comparator 407 is varied by the position signal from the seat position sensor 408 in accordance with the position of the person on board, so that when the air bag is sufficiently inflated, the head of the person on board precisely hits against the air bag. Reference characters 417a–417d in FIG. 27 form an ignition timing estimating means ranging from voltage dividing resistors over the inflation timing decision circuit, the resistors 417a–417d, the comparator 407 and the AND gate 414.

In such a conventional person-on-board protecting apparatus, since it has been arranged that the head of the person on board reaches a predetermined position after the passage of the predetermined time after the collision and hits against the air bag, the head position of the person on board varies with the angle of the back portion of the seat, for example, when the seat is reclined or not reclined, though the longitudinal position of the seat remains the same. In other words, the air bag that has completely been inflated-may not bump against the head of the person on board and when the seat is excessively drawn forward, the air bag that has completely been inflated may also not strike against the head thereof.

FIG. 30 shows a conventional apparatus for giving a warning about a seating condition by way of example.

As shown in FIG. 30, an infrared-beam emitting element 505 and a beam receiving element (not shown: incorporated in the infrared-beam emitting element 505) are provided in an instrument panel 504 disposed in front of a person on board 503 sitting on the seat 502 of a vehicle 501. The infrared-beam emitting element 505 is operated by a control-arithmetic circuit 507 to receive light reflected from the person on board 503 by means of the light receiving element, whereas the control-arithmetic circuit 507 calculates distances D1, D2 according to the trigonometrical measurement method. The control-arithmetic circuit 507 determines the presence or absence of the person on board 503 from the distances D1, D2 thus calculated and the sliding position L of the seat detected by an seating-position detecting sensor 508 and outputs a signal for allowing an air-bag device 509 for a passenger seat to operate when the person on board 503 sits on the seat. When the controlearithmetic circuit 507 determines that the person on board 503 is not sitting on the seat, it outputs a non-permit signal to the air-bag device 509 for a passenger seat and prohibits the air bag from inflating even when the air-bag device 509 for a passenger seat judges that a serious accident has occurred.

Since the air bag is inflated irrespective of the seating condition of the person on board 503 in the conventional apparatus for giving a warning about a seating condition, there has been the possibility that the air bag functions improperly even though it is inflated unless the person on board 3 is sitting on the seat in a right posture.

An apparatus for detecting the presence of a person on board which similar in type to the captioned apparatus has been described in, for example, Japanese Patent Publication No. 78539/1995 and the general description of such an apparatus will subsequently be given by reference to FIG. 39.

A steel plate forming the roof 602 of a vehicle 601 and a metal plate 604 embedded in the seating portion 603a of a seat 603 form a pair of electrode plates to form a capacitor C. When a person on board sits on a seat between the pair of electrode plates comprising the steel plate forming the roof 602, and the metal plate 604, the coefficient of electrostatic induction between the pair of electrode plates varies, so that whether the person is sitting on the seat 603 is detected by detecting a change in that coefficient.

Reference numeral 605 denotes an instrument panel provided in front of the driver's seat of the vehicle 601.

In such an apparatus for detecting the presence of a person on board, however, the space between the electrode plates is large because the electrostatic capacitance C is formed between the electrode plate installed beneath the seating portion of the seat and the steel plate formed on the ceiling of the vehicle. Thus, the electrostatic capacitance C formed therebetween is small and the problem is that a greater quantity of variation is impossible to secure even when the person enters between the electrode plates.

SUMMARY OF THE INVENTION

The present invention has been made to solve the above problems with the prior art, and therefore an object of the present invention is to provide a weighing apparatus which is embedded in a seat and not exposed outside.

Another object of the invention is to provide a weight detecting apparatus that corrects signals from a seat portion and a back portion of a seat with an reclining angle to obtain a weight signal with a desired accuracy on the basis of the corrected signal.

Still another object of the present invention is to provide an apparatus for detecting an auxiliary-seat mounting direction utilizing only one antenna that can easily be mounted.

Yet still another object of the present invention is to provide a person-on-board protecting apparatus designed to vary the ignition timing of such as an air bag according to various driving postures of a person on board, whereby the ignition timing and inflation force (inflation rate) are made adjustable.

Yet still another object of the present invention is to provide an apparatus for giving a warning about a seating condition in which when the seating condition is abnormal, a person on board is given a warning in order to demonstrate the air-bag function.

Yet still another object of the present invention is to provide an apparatus for detecting the presence of a person on board which is capable of easily detecting the presence of a child or a so-called standing child who is standing in front of an instrument panel by disposing a plurality of electrode plates in front of a seat to form electrostatic capacitance and detecting variations in the electrostatic capacitance to inhibit the inflation of the air bag so that the child is prevented from being blown off backward when the air bag is inflated.

According to a first aspect of the present invention, there is provided a weighing apparatus comprising an air bag installed in a portion of a seat to which the weight of a person sitting thereon is applied, air pressure in the air bag being measured by a pressure sensor, detection means for detecting the presence or absence of a person sitting on the seat, and air-pressure regulating means for regulating the air pressure in the air bag when the absence of the person is detected by the detection means therefor so as to make the air pressure constant, wherein a signal indicating the weight of the person sitting thereon is output from the output of the pressure sensor when the sitting condition is detected by the detection means for detecting the presence or absence of a person sitting on the seat.

According to a second aspect of the invention, there is provided an apparatus for detecting the weight of a person sitting on a seat comprises pressure sensors which respectively are provided for the seat portion and back portion of a seat having the function of making adjustable the angle of the back portion to the seat portion, and an angle sensor for detecting the reclining angle, wherein detection outputs from the respective pressure sensors are corrected with a detection output from the angle sensor and wherein the corrected detection outputs of the pressure sensors are added ups so that the weight of a person sitting on the seat is detected.

According to a third aspect of the invention, there is provided an apparatus for detecting an auxiliary-seat mounting direction comprising a discretely-set code generating device which is provided in two places in the longitudinal direction of an auxiliary seat mounted on a seat other than a driver's seat, and a wireless device for reading the code set in the code generating device by electromagnetic coupling to the code generating device, the wireless device being provided in the back of the seat on which the auxiliary seat is to be mounted, wherein the wireless device identifies the code received and outputs a signal indicating whether the auxiliary seat is forward- or backward-turned.

According to a fourth aspect of the invention, there is provided a person-on-board protecting apparatus comprising:

ignition timing estimating means for outputting an ignition signal by determining a collision on the basis of an output from an acceleration sensor and estimating timing at which the head of a person on board reaches a predetermined position, expansion rate control means for outputting a control signal for controlling the expansion force of an air bag according to the head position of the person on board from a forward predetermined reference position, and an inflator having a plurality of detonators wherein the ignition modes of the plurality of detonators provided for the inflator are controlled according to an ignition signal from the ignition timing estimating means and a control signal from expansion force control means, whereby the expansion rate and timing of the air bag are controlled.

According to a fifth aspect of the present invention, there is provided an apparatus for giving a warning about a seating condition comprising a first pressure sensor for receiving the weight of a person sitting on a seat, the first pressure sensor being installed in the seat portion of a seat, a second pressure sensor for receiving the weight of the person sitting on the seat, the second pressure sensor being installed in the back seat portion of the seat, and a sensor for detection a seat-belt drawing quantity, wherein a signal for giving a warning about an abnormal seating condition when the output of any one of the sensors does not satisfy a reference value.

According to a sixth aspect of the invention, there is provided an apparatus for detecting the presence of a person on board according to a first embodiment of the present invention comprises a plurality of electrodes for forming electrostatic capacitance, and the electrodes being disposed on the front side of a seat, an oscillation circuit by means of the electrostatic capacitance wherein when the person thereon makes an approach to an electrode plate, the oscillation frequency of the oscillation circuit is caused to vary by changing a coefficient of electrostatic induction of the electrostatic capacitance.

BRIEF DESCRIPTION OF THE DRAWINGS

FIG. 26 is a table displaying a logical combination of the output terminals A–F of the control circuit in FIG. 25 in order to explain control contents by the combination;

DETAILED DESCRIPTION OF THE PREFERRED EMBODIMENTS

Now, a description will be given in more detail of a variety of preferred embodiments of the present invention with reference to the accompanying drawings.

(Embodiment 1)

Figure 1:
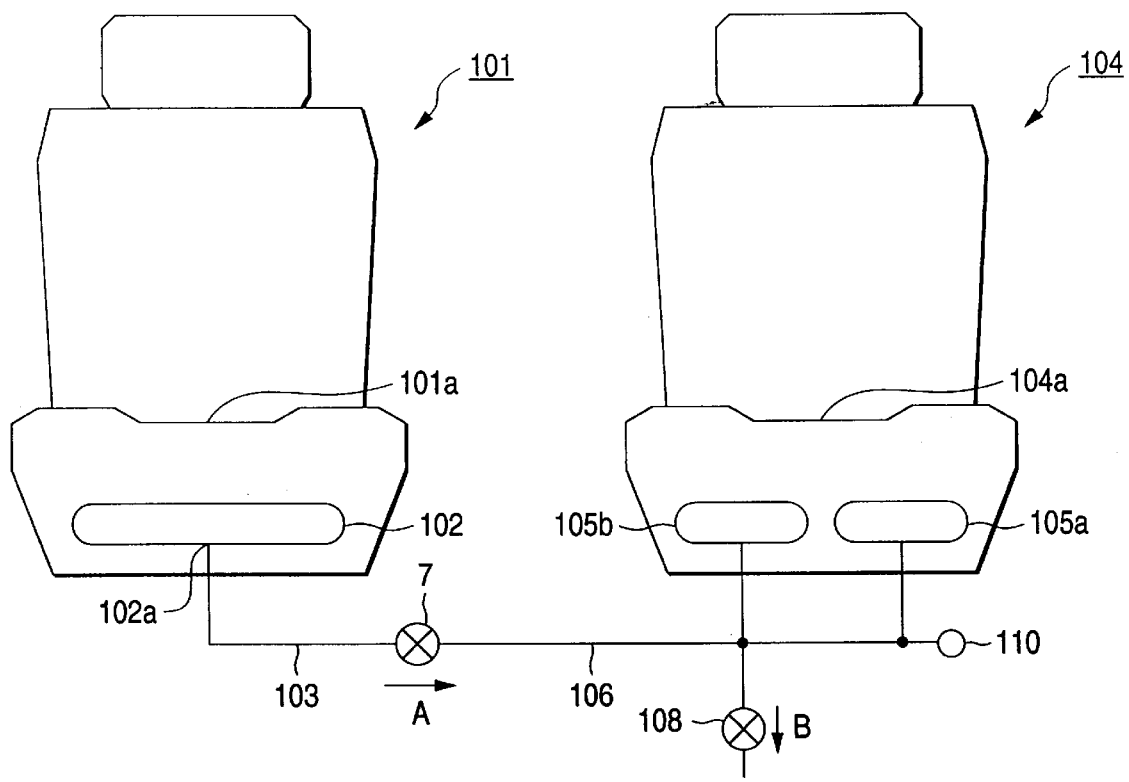
FIG. 1 is a schematic diagram illustrating an embodiment of the present invention.
Figure 2:
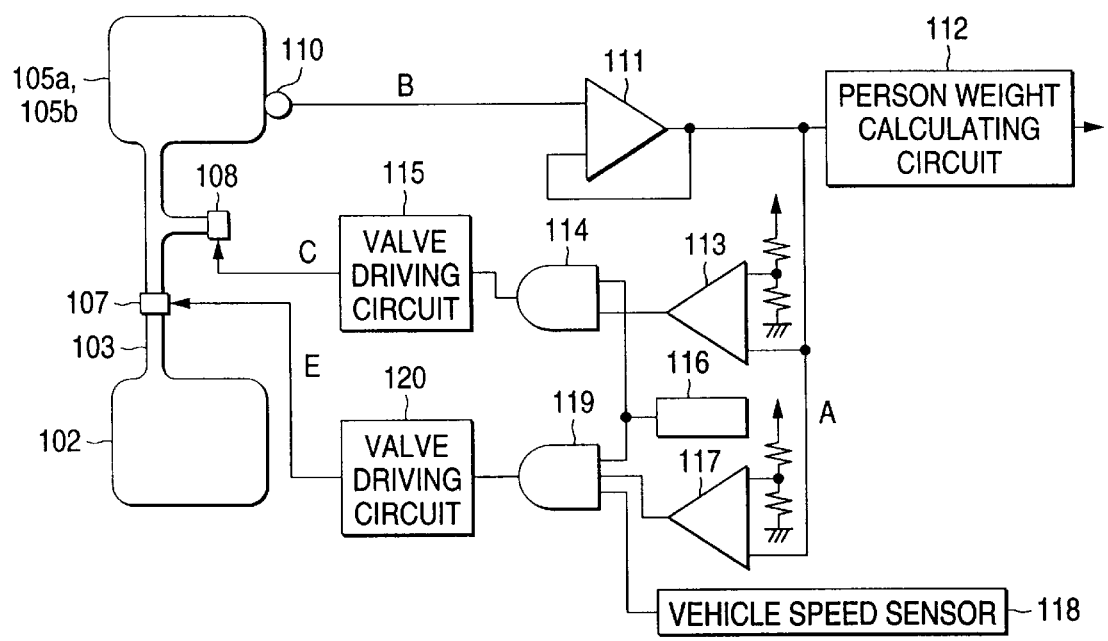
FIG. 2 is a circuit arrangement illustrating a control circuit for controlling the arrangement of FIG. 1.
Figure 3:
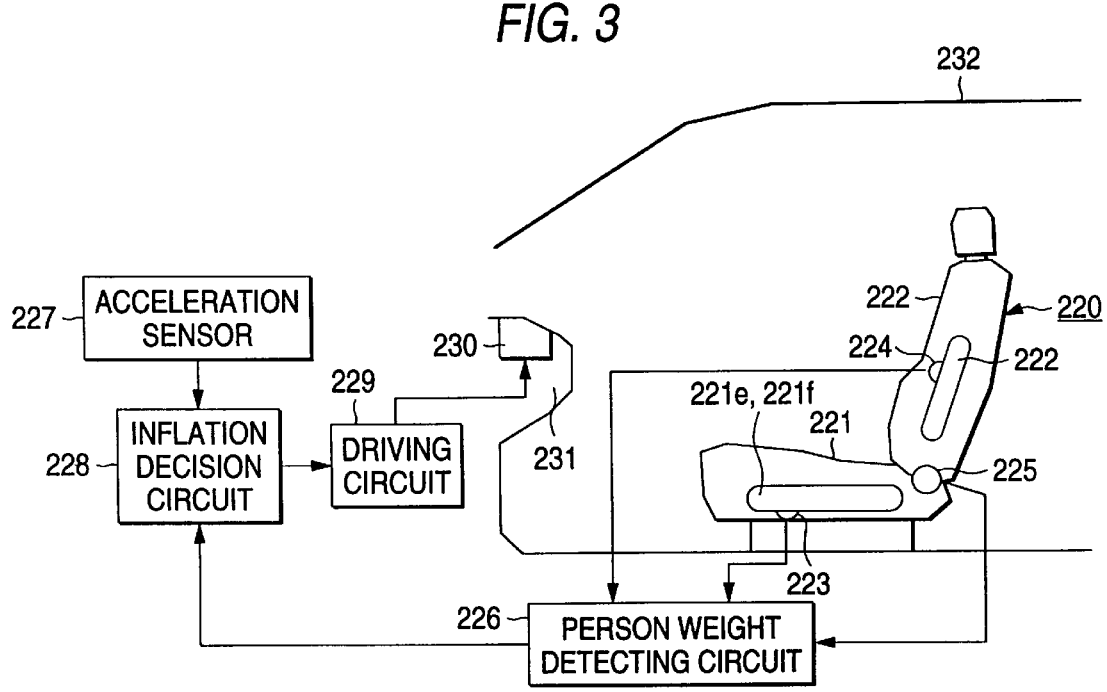
FIG. 3 is a diagram illustrating the whole of a person-on-board protective apparatus embodying the present invention.

Referring to FIG. 1, there is illustrated an embodiment of the present invention.

In FIG. 1, reference numeral 1 denotes a driver's seat and an air bag 102 is installed within the seating portion 101a of the seat 101. The vertical motion of a driver caused by traveling on an uneven road surface results in the repetition of the operation of compressing and resetting the air bag 102, and the air is discharged through a discharge port 102a into a pipe 103. When the air bag 102 is restored to the original size as external force is released, the air is introduced via a one-way valve (not shown) into the air bag 102 from the outside. The one-way valve is closed when the compressed air is discharged from the air bag 102. Reference numeral 104 is a passenger seat in which a plurality of air bags 105a, 105b are embedded and coupled together in such a way that the air is allowed to pass therethrough via a pipe 106. The pipes 103, 106 are coupled together by a one-way valve 107 for sending the air under pressure only in the direction of A, Reference numeral 108 denotes a relief valve which operates to keep constant the air pressure in the plurality of air bags 105a, 105b embedded in the passenger seat 104 by replenishing the air pressure while no person is sitting on the passenger seat 104. In this case, the one-way valve 107 and the relief valve 108 are respectively controlled by signals from driving circuits 115, 120, which will be described later. The air bags 102, 105a and 105b are made of a material which is non-expandable and not-contractable even if the person is sit on those air bags 102, 105a and 105b.

Reference numeral 110 denotes a pressure sensor for measuring the air pressure in the air bag 105a installed in the ceating portion 104a of the passenger seat 104 and used for supplying a detected pressure signal via a driver 111 to a circuit 112 for calculating the weight of a person sitting on a passenger seat, which will be described later. The circuit 112 for calculating the weight of a person sitting. on a passenger seat receives the detected pressure signal from the pressure sensor 110, calculates the weight of a person sitting on the passenger seat according to the signal and outputs a signal indicating that the person on board is sitting on the seat when the detected weight is 30 Kg or greater, for example.

Reference numeral 113 denotes a first comparator which receives the detected pressure signal supplied to the circuit 112 for calculating the weight of a person sitting on a passenger seat from the driver 111 and supplies a high-level signal to a first AND gate 114 when the size of the signal exceeds a set reference value. On receiving the high-level signal from a seating switch 116, which will be described later, the first AND gate 114 causes the relief valve 108 to be opened via a first valve driving circuit 115. The seating switch 116 is turned off when the person sits on the passenger seat 104 and outputs a low-level signal and otherwise outputs the high-level signal when no person sits on the seat.

Reference numeral 117 denotes a second comparator receives the detected output signal supplied to the circuit 112 for calculating the weight of a person sitting on a passenger seat from the driver 111 and supplies the high-level signal to a second AND gate 119 when the size of the signal becomes smaller than the set reference value. The second AND gate 119 causes the one-way valve 107 to be opened via a second valve driving circuit 120 when it is supplied with the high-level signal from the seating switch 116 and the high-level signal indicating that the vehicle is traveling from a vehicle speed sensor 118.

The operation of the apparatus thus arranged will subsequently be described.

(1) While a person is sitting on the passenger seat 104:

As the seating switch 116 is turned off and supplies the low-level signal to the first and second AND gates 114, 119, both valves 107, 108 are kept closed even though the vehicle is traveling and the replenishment of the air into the air bags 105a, 105b for the passenger seat from the air bag 102 from the side of the driver's seat 101 is stopped. The circuit 112 for calculating the weight of a person sitting on a passenger seat calculates the weight of the person sitting on the passenger seat 104 and outputs the calculated result according to the detected output signal from the pressure sensor 110 via the driver 111.

(2) While no person is sitting on the passenger seat 104 with the vehicle in the standstill condition:

Although the seating switch 116 is turned on and supplies the high-level signal to the first and second AND gates 114, 119, the low-level signal is supplied to the second AND gate 119 from the vehicle speed sensor 119, whereby the one-way valve 107 is kept closed. Moreover, though the relief valve 108 is opened when the air pressure in the air bags 105a, 105b of the passenger seat 104 exceeds the reference value of the first comparator 113, it in not opened when the air pressure does not exceed the reference value. Consequently, the replenishment of the air to the air bags 105a, 105b for the passenger seat from the air bag 102 on the side of the driver's seat 101 is stopped and the circuit 112 for calculating the weight of a person sitting on a passenger seat calculates the weight of the person sitting on the passenger seat 104 and outputs the calculated result according to the detected output signal from the pressure sensor 110.

(3) While no person is sitting on the passenger seat 104 with the vehicle in the traveling condition:

The seating switch 116 is turned on and supplies the high-level signal to the first and second AND gates 114, 119 and when the air pressure in the air bags 105a, 105b of the passenger seat 104 exceeds the reference value of the first comparator 113, the relief valve 108 is opened and then closed when the air pressure in the air bags 105a, 105b becomes constant.

When the air pressure in the air bags 105a, 105b of the passenger seat 104 does not exceed the reference values of the first and second comparators 113, 117 and when the high-level signal is supplied to the first and second AND gates 114, 119 from the vehicle speed sensor 110, the relief valve 108 is closed and the one-way valve 107 is opened. Consequently, the air is replenished from the air bag 102 for the driver's seat 101 to the air bags 105a, 105b for the passenger seat.

(Embodiment 2)

Referring to FIGS. 3–9, there is illustrated an embodiment of the present invention.

Figure 4:
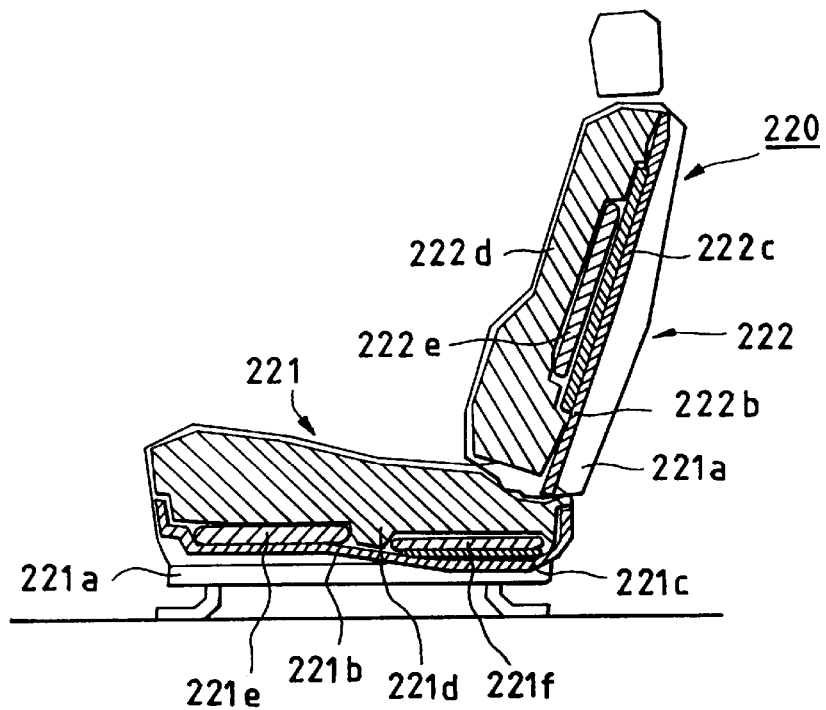
FIG. 4 is a sectional view showing a case where air bags are installed in a seat having S-springs.

Reference numeral 220 denotes a seat formed with a seat portion 221 and a back portion 222, and the seat portion 221 comprises, as illustrated in a sectional view of FIG. 4, a seat frame 221a, a seat frame body 221b, S-springs 221c and a seat pad 21d. A plurality of unstretchable air bags 221e, 221f are installed between the seat frame body 221b and the seat pad 221d or between the S-springs 221c and the seat pad 221d. The air bags 221e, 221f are coupled together by pipes 221g, 221h, and the pressure therein is totally detected by a first pressure sensor 223. Like the first embodiment, the air bags used in the second embodiment is made of a material which is non-expandable and non-contractable even if the weight of a person is applied thereto.

Similarly, the back portion 222 comprises a back frame 222a, a back frame body 222b and a back pad 222d. A plurality of unstretchable air bags 222e are installed between the S-springs 221c and the back pad 222d. The air bags 222e are coupled together by pipes 222f, and the pressure therein is totally detected by a second pressure sensor 224.

Figure 5:
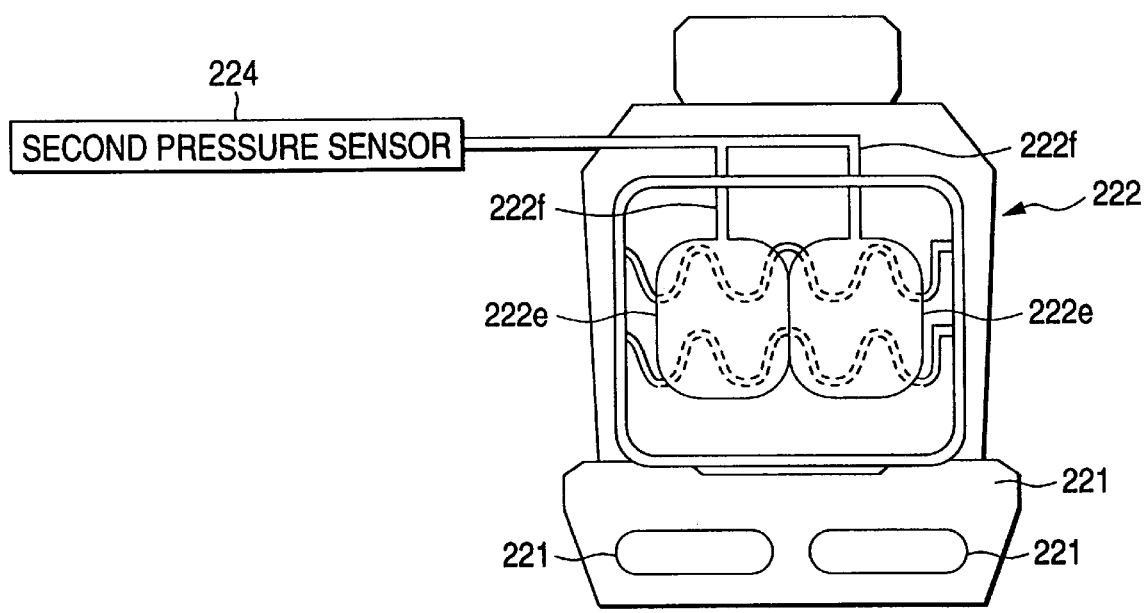
FIG. 5 is a sectional view of the principal part as viewed from the front of the seat shown in FIG. 4.
Figure 6:
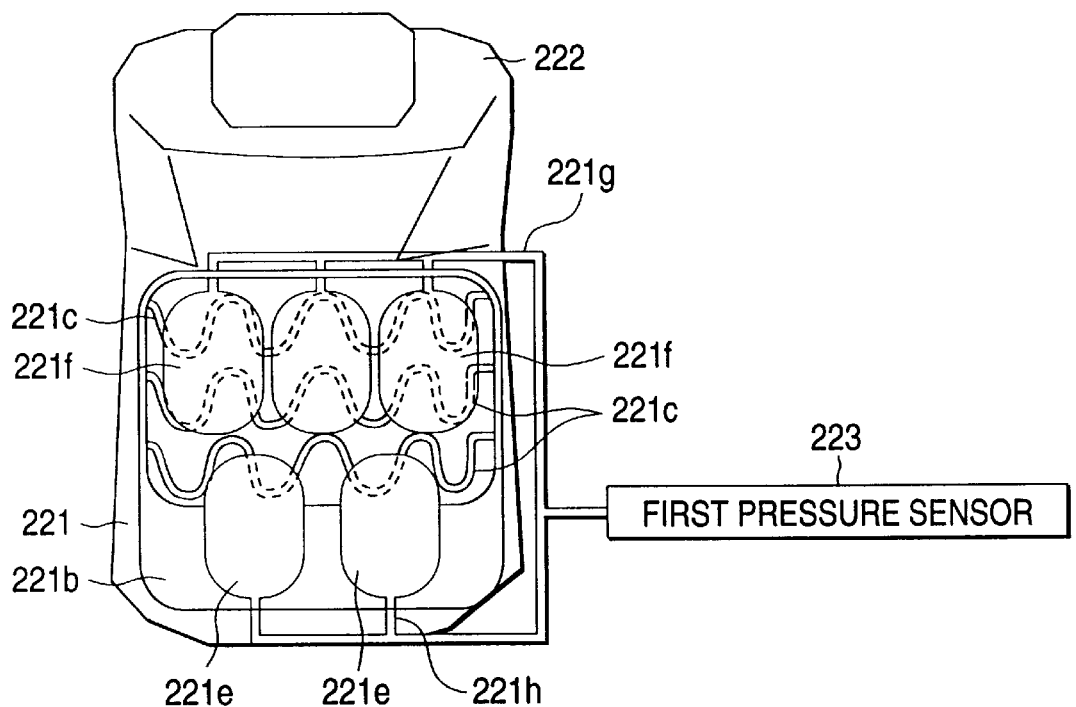
FIG. 6 is a sectional view of the principal part as viewed from the top of the seat shown in FIG. 4.
Figure 7:
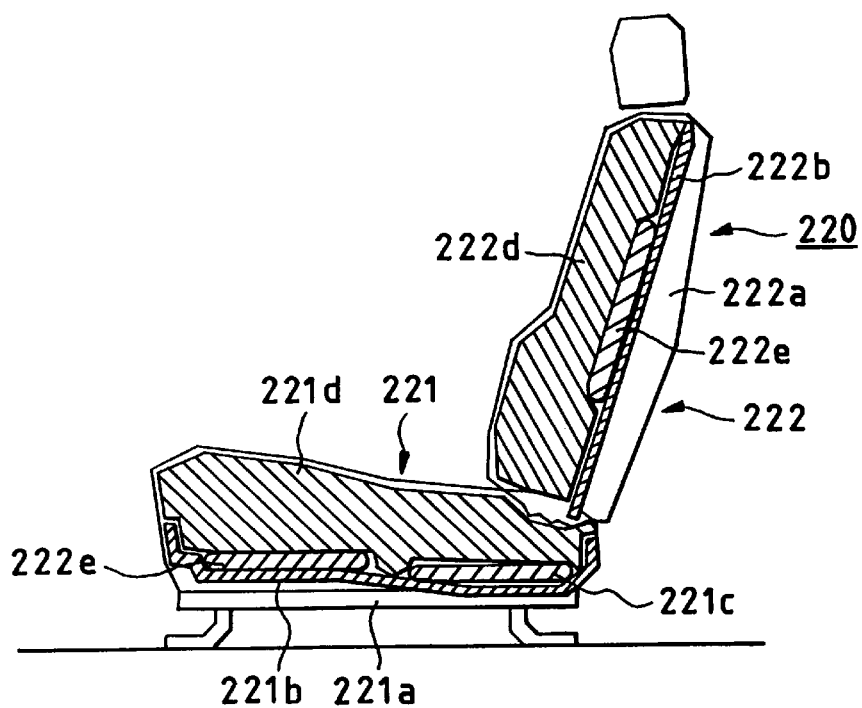
FIG. 7 is a sectional view showing a case where air bags are installed in a seat without having the S-springs in FIG. 4.
Figure 8:
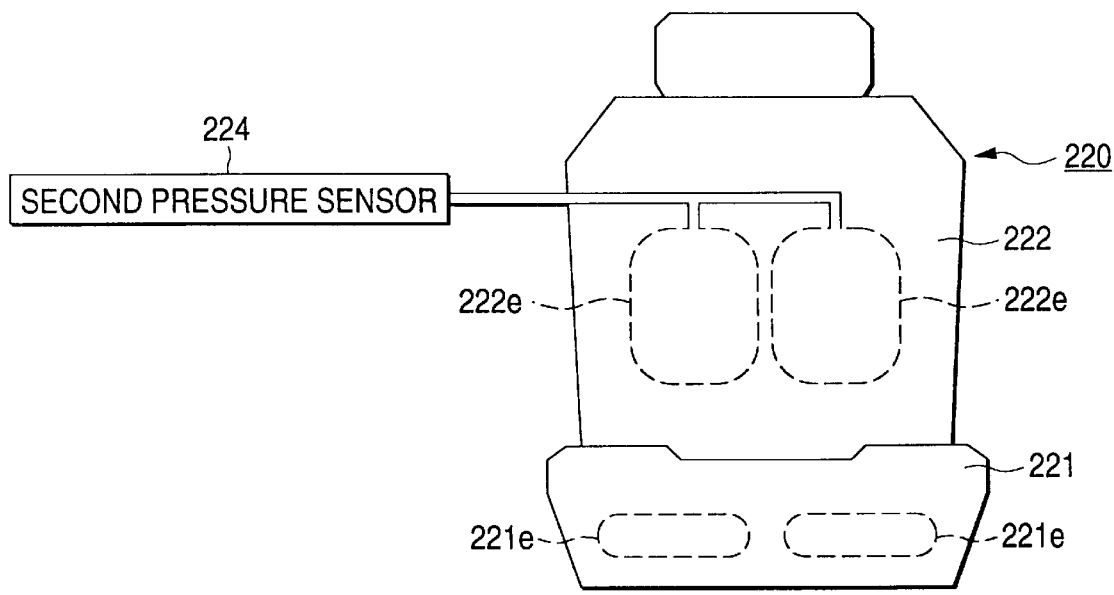
FIG. 8 is a sectional view of the principal part as viewed from the front of the seat shown in FIG. 7.
Figure 9:
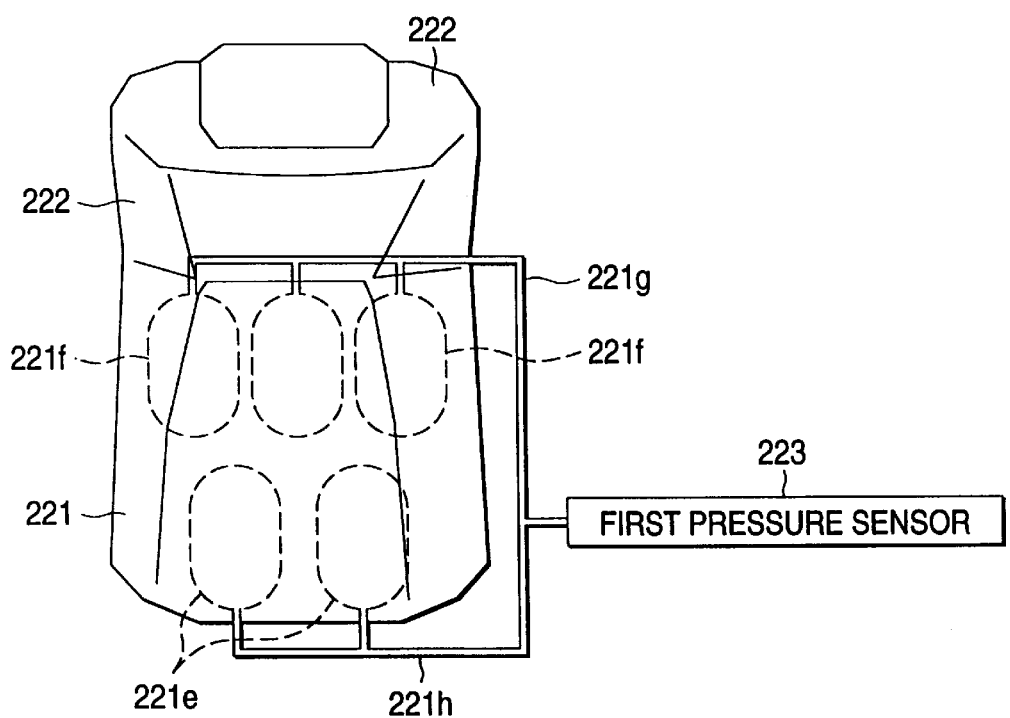
FIG. 9 is a sectional view of the principal part as viewed from the top of the seat shown in FIG. 7.

In the case of a seat 220 without S-springs 221c, 222c as shown in FIGS. 7–6 (as this seat 220 is equivalent to what is shown in FIGS. 5–6, like reference characters are give to this seat), an arrangement in this case is needless to say made so that the air bags 221e, 221f of a seat portion 221 are installed only between a seat frame body 221b and a seat pad 221d, and so are the air bags 222e of a back portion 222 only between a back frame body 222b and a back pad 222d.

Reference numeral 225 denotes an angular sensor for use in detecting the reclining angle of the seat 220, that is, an angle in its resting position; and 226., a circuit for detecting the weight of a person on board, which circuit is supplied with signals respectively from the first pressure sensor 223, the second pressure sensor 224 and the angle sensor 225, corrects the detection outputs from the first and second pressure sensors 223, 224 with the detection output from the angle sensor 225, adds up the corrected results, and detects the weight W of the person sitting on the seat 220 according to an equation below:

$$W = (K1 \cdot a + K2 \cdot b) \cdot c$$

where a: output of the first pressure sensor 223; b: output of the second pressure sensor 224; c: coefficient; and K1, K2: function of the reclining angle.

The circuit 226 for detecting the weight of a person on board outputs a signal indicating the presence of a person sitting on the seat when it determines that the weight W thus calculated exceeds a predetermined value, that is, the weight W is 30 Kg or greater, for example.

Figure 15:
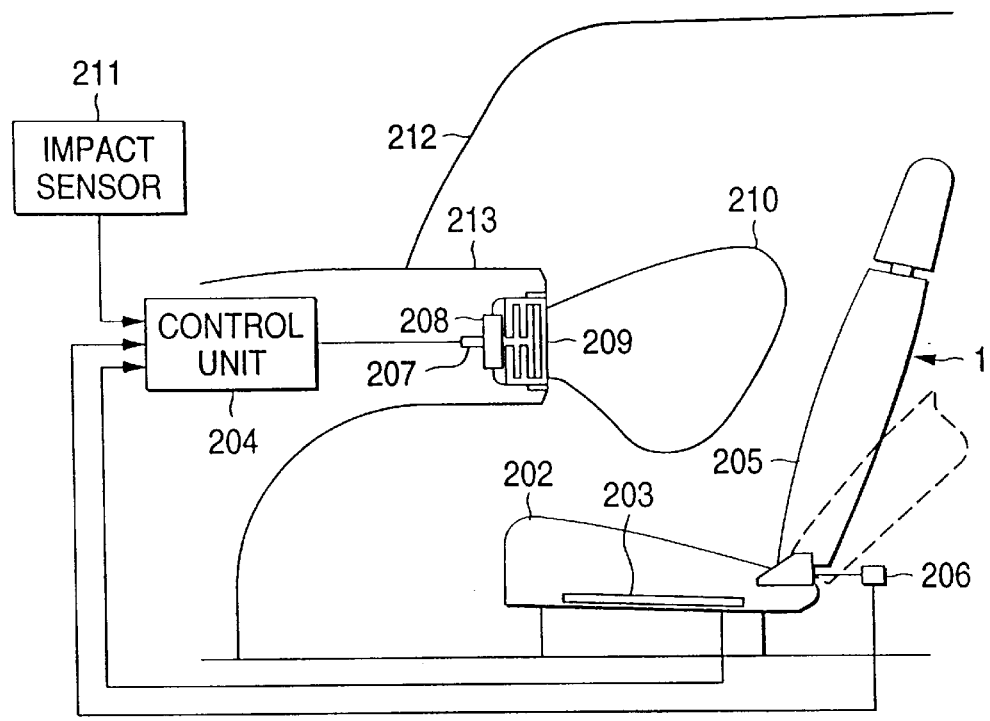
FIG. 15 is a diagram illustrating the whole of a conventional person-on-board protective apparatus embodying the present invention.
Figure 16:
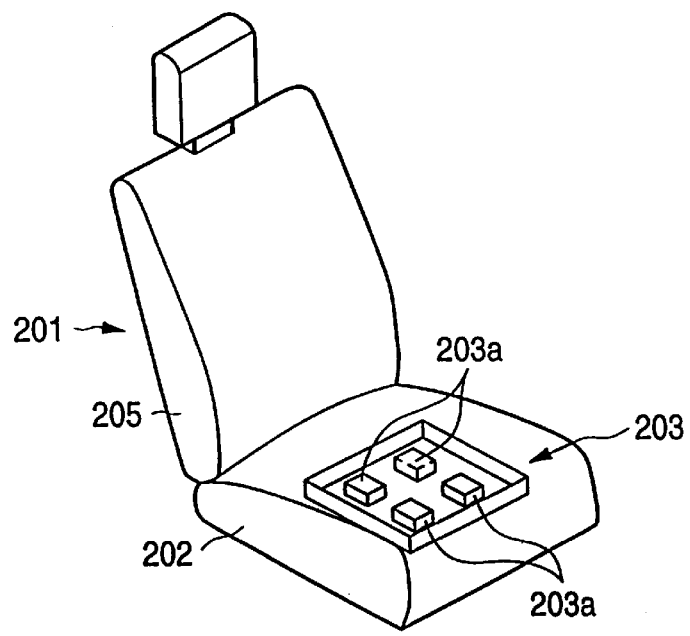
FIG. 16 is diagram illustrating a weighing sensor in FIG. 15.
Figure 17:
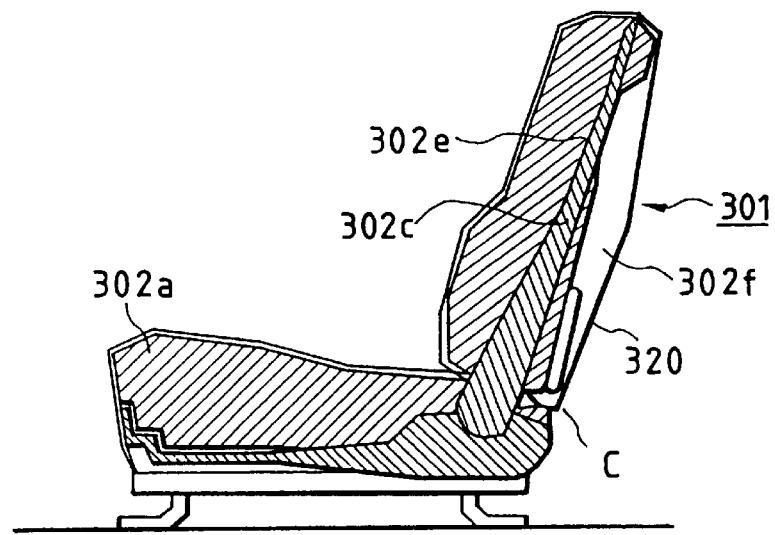
FIG. 17 is a side sectional view of a seat embodying the present invention.
Figure 18:
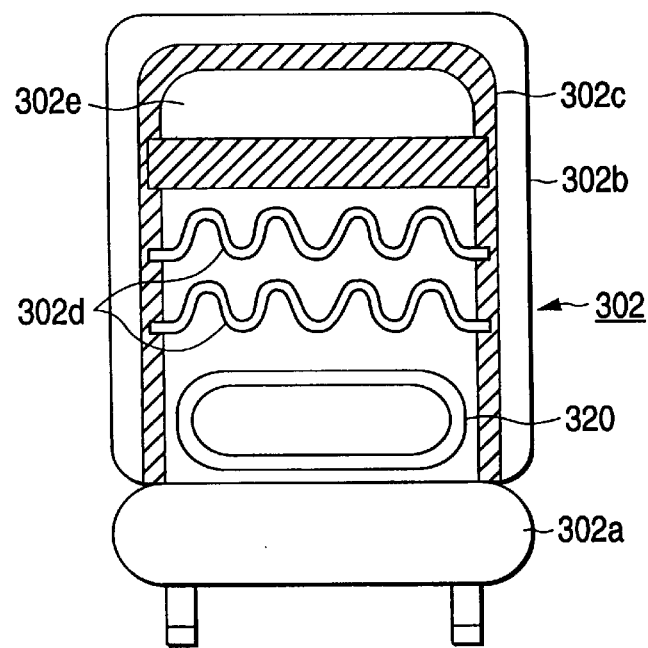
FIG. 18 is a elevational sectional view of FIG. 17.

Reference numeral 227 denotes an acceleration sensor which is equivalent to the impact sensor 211 in FIG. 15 and used for detecting the acceleration caused when a vehicle 232 collides with something in order to supply an acceleration signal corresponding to the collision to an inflation decision circuit 228 which will be described later. On receiving the acceleration signal from the acceleration sensor 227 after a signal indicating that a person having not less than predetermined weight remains to sit on the seat 220 is supplied from the circuit 226 for detecting the weight of a person on board to the seat 220, the inflation decision circuit 228 operates to inflate the air bags by supplying an ignition current to an detonator (shown by numeral 207 in FIG. 15) as a constituent of an air-bag module 230 for a passenger seat via a driving circuit 229 by means of an inflation signal when the inflation decision circuit 228 judges that a serious collision accident has occurred according to the acceleration signal. Incidentally, component parts similar to the detonator 207, the inflator 208, the air bag 9 and the like in FIG. 13 needless to say constitute the air-bag module 230 for a passenger seat.

Figure 10:
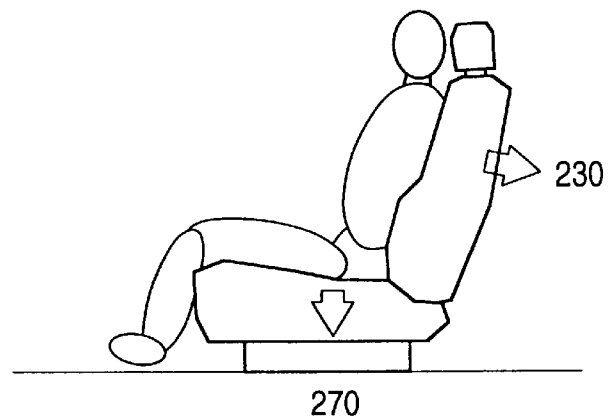
FIG. 10 is a diagram illustrating the division of the force applied to the seat portion and the back portion when a person on board sits on the seat with normal posture.
Figure 11:
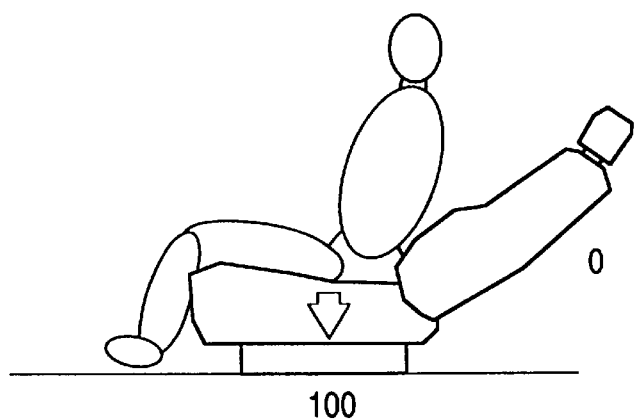
FIG. 11 is a diagram illustrating the situation in which the weight of a person is applied not to the back portion of the seat but only to the seat portion thereof when the back portion of the seat is reclined backward.
Figure 12:
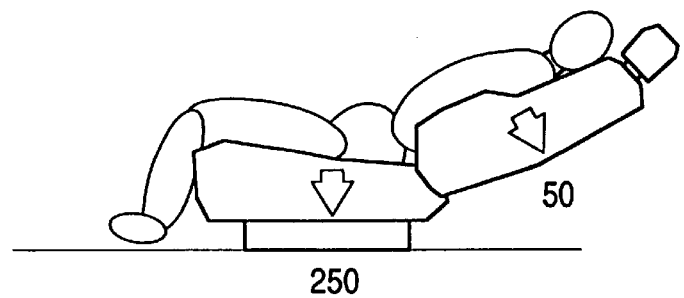
FIG. 12 is a diagram illustrating the division of the force applied to the seat portion and back portion of the seat when the person leans on the back portion after bringing the back portion down.

When a person sits on the seat 220 thus arranged, the weight of the person is supported with the seat portion 221 and back portion 222 of the seat 220, and the weight is converted by the air bags 221e, 221f, 222e into air pressure, which is subsequently converted by the first and second pressure sensors 223, 224 into a quantity of electricity respectively connected thereto. By this is meant that the same quantity of electricity is detected even though the seat 220 is reclined at any given angle or no matter how the person sits thereon on condition that the weight is the same. An shown in FIG. 10, there are typical examples where (1) the person on board sits on the seat with erect posture; (2) he sits on the seat with the back portion 222 reclined backward as shown in FIG. 11; (3) he leans on the back portion 222 which has been brought down as shown in FIG. 12; and so forth. A description will subsequently be given of the fact that the weight of the person sitting on the seat is detected by the circuit 226 for detecting the weight of a person on board in any case.

Figure 13:
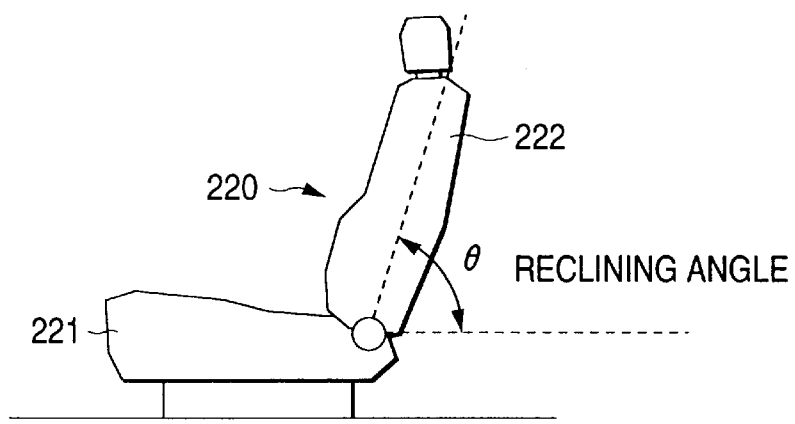
FIG. 13 is a diagram defining the reclining angle a of the seat.
Figure 14:
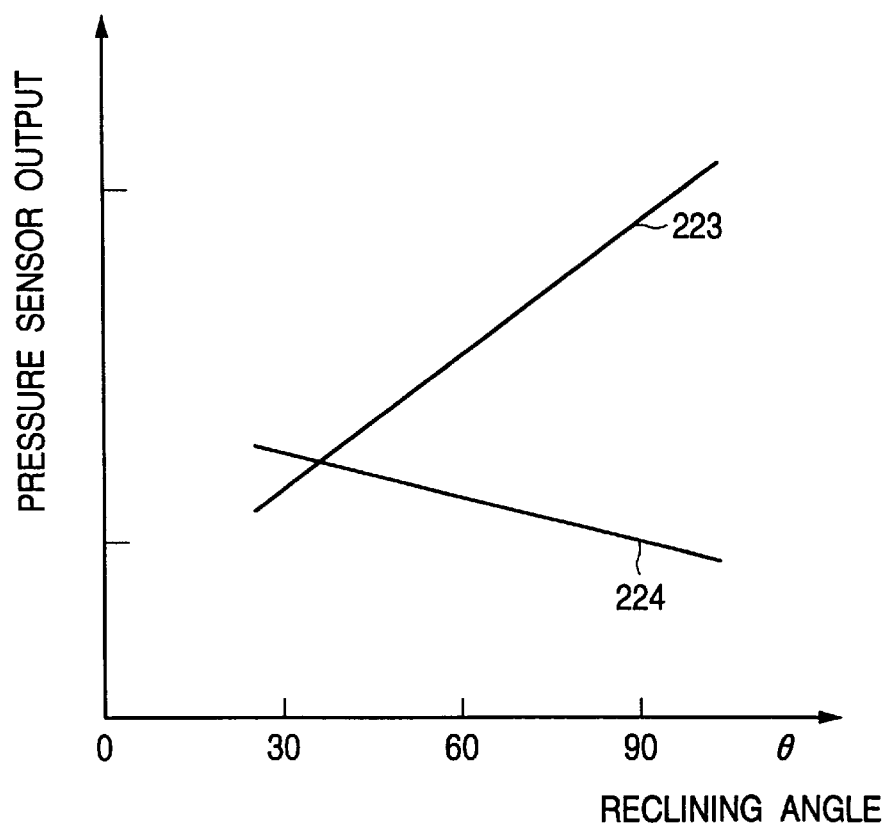
FIG. 14 is a characteristic drawing showing the relation between the reclining angle 8 and the output voltages of a first and second pressure sensor.

When the reclining angle θ of the seat 220 is changed as shown in FIG. 13, the characteristics shown in FIG. 14 are obtained from the first and second pressure sensors 223, 224. The circuit 226 for detecting the weight of a person on board makes calculations based on the signals indicating the pressures obtained from both sensors according to the aforementioned equation to work out the weight of the person sitting on the seat. When the weight thus obtained is judged to be a predetermined value or less, the circuit 226 for detecting the weight of a person on board outputs a signal for permitting the inflation decision circuit 228 to output an ignition signal according to the acceleration signal from the acceleration sensor 227 with the person sitting on the seat as an object for protection with the air bags.

(Embodiment 3)

Referring to FIGS. 17–20, there in illustrated an embodiment of the present invention.

In FIGS. 17–20, like reference characters designate like or equivalent parts described in the arrangement shown in FIGS. 21–24 with the omission of the description thereof and only those different therefrom will subsequently be described.

More specifically, though the pair of antennas 303a, 303b have been embedded in the seat 301 as shown in FIGS. 21–24, only one antenna 320 is used as shown in FIGS. 17–20 and the antenna 320 is bonded to the inner side of a back cover 302f by means of a double-coated tape out of a back frame 302c, an S-spring 302d, a back pad 302e, the back cover 302f and the like constituting the back portion 302b of the above seat. As a hook (not shown) is used for attaching the back cover 302f to the back frame 302c, this arrangement has the effect of forcing in the antenna 320 from the direction shown by symbol C of FIG. 17.

This embodiment of the present invention is different from the example shown in FIGS. 21–24 in that the same code generators 306, 307 are embedded in both longitudinal end portion of the seating portion of the auxiliary seat 304 in the form came instead of embedding the pair of code generators 306, 307 in the auxiliary seat 304 in the bilateral symmetrical fashion in the latter case.

Figure 19:
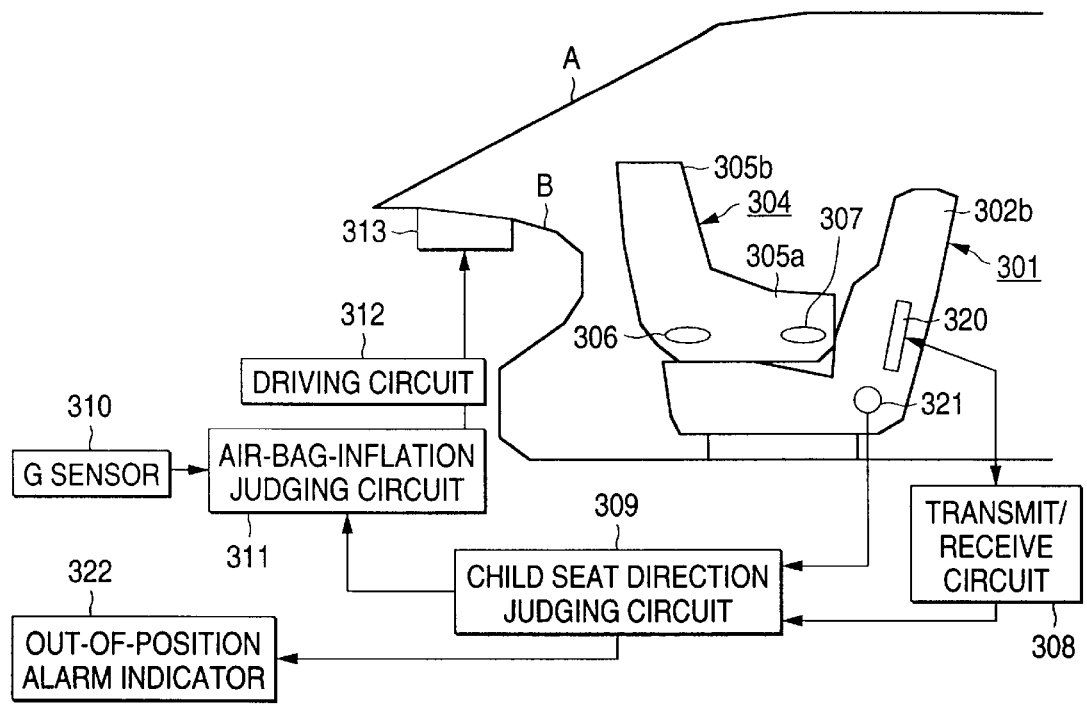
FIG. 19 is a diagram illustrating a system in the form of an apparatus for detecting an auxiliary-seat mounting direction embodying the present invention with an auxiliary seat which is back-ward turned.
Figure 20:
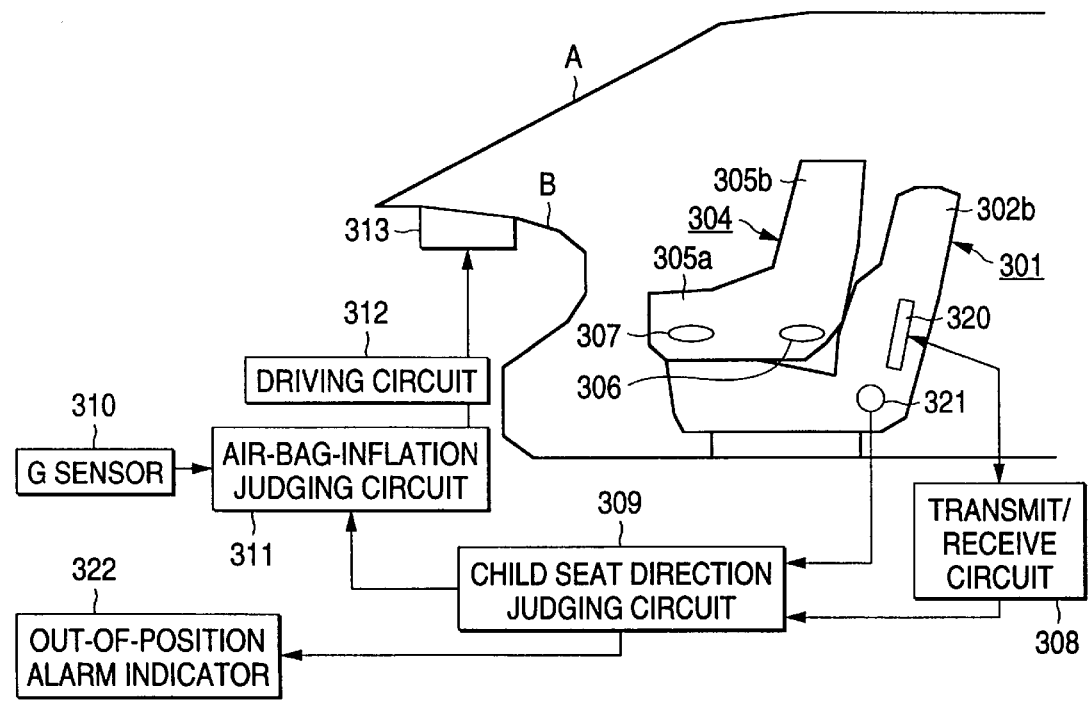
FIG. 20 is a diagram illustrating the auxiliary seat of FIG. 19 which is forward-turned.
Figure 21:
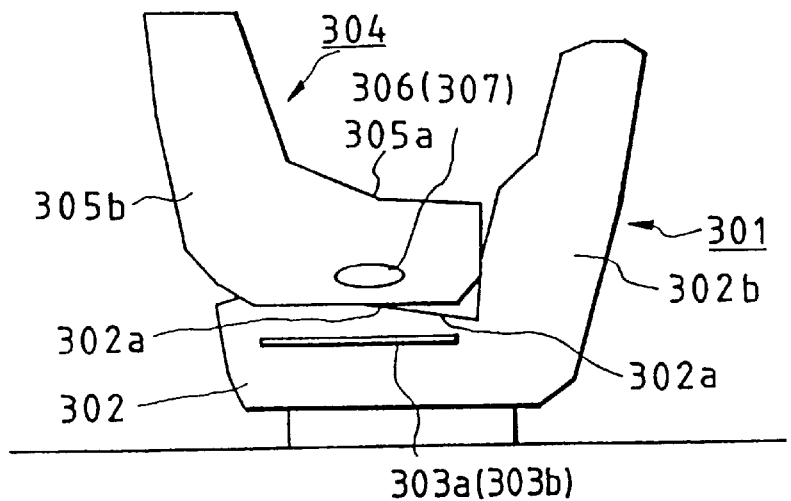
FIG. 21 is a diagram illustrating conventional antennas mounted in a seat and code generators mounted in a auxiliary seat.
Figure 22:
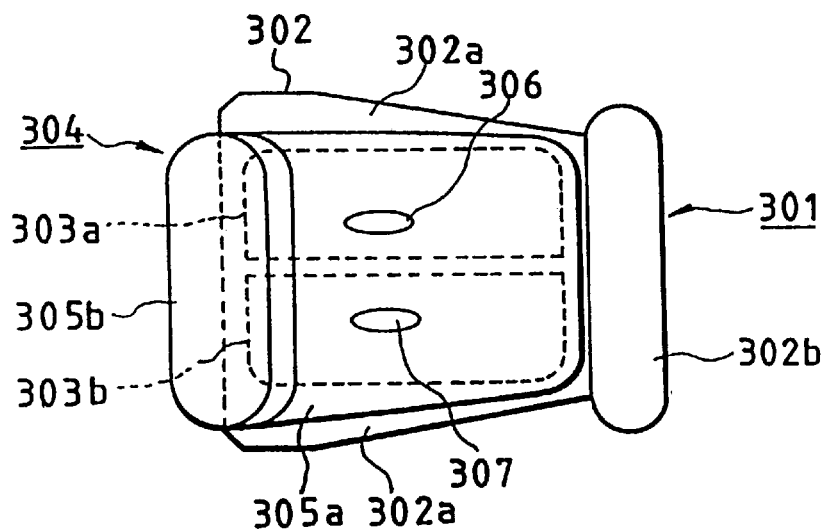
FIG. 22 is a plan view of FIG. 21.
Figure 23:
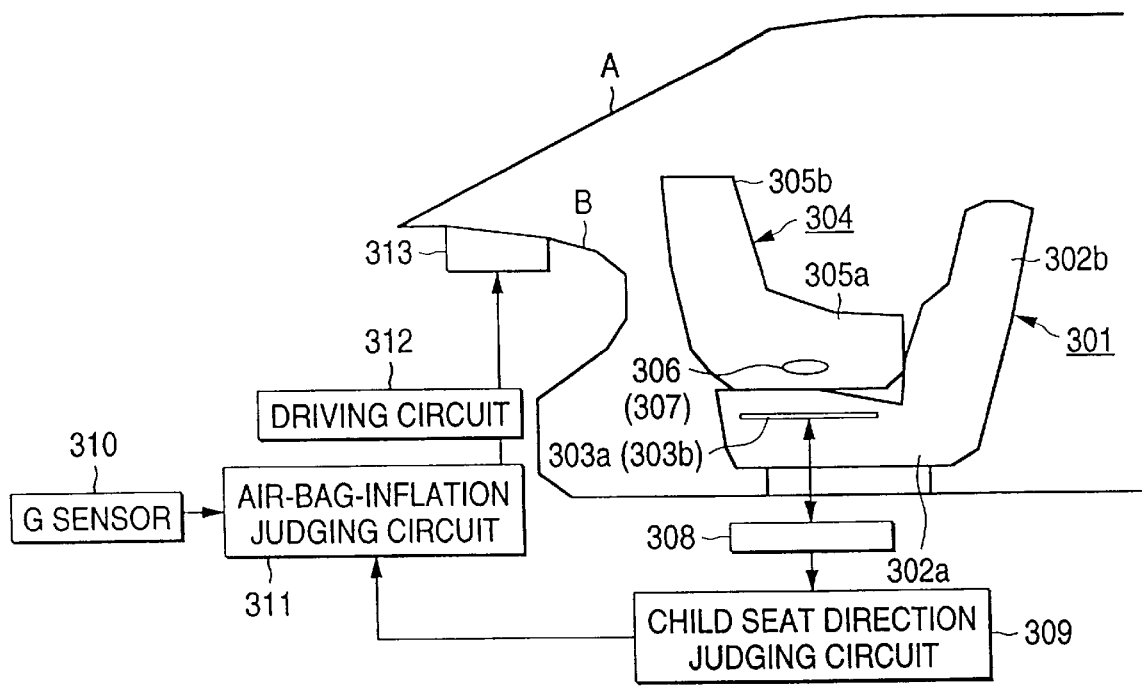
FIG. 23 is a diagram illustrating a system in the case of a conventional apparatus for detecting an auxiliary-seat mounting direction with an auxiliary seat which is back-ward turned
Figure 24:
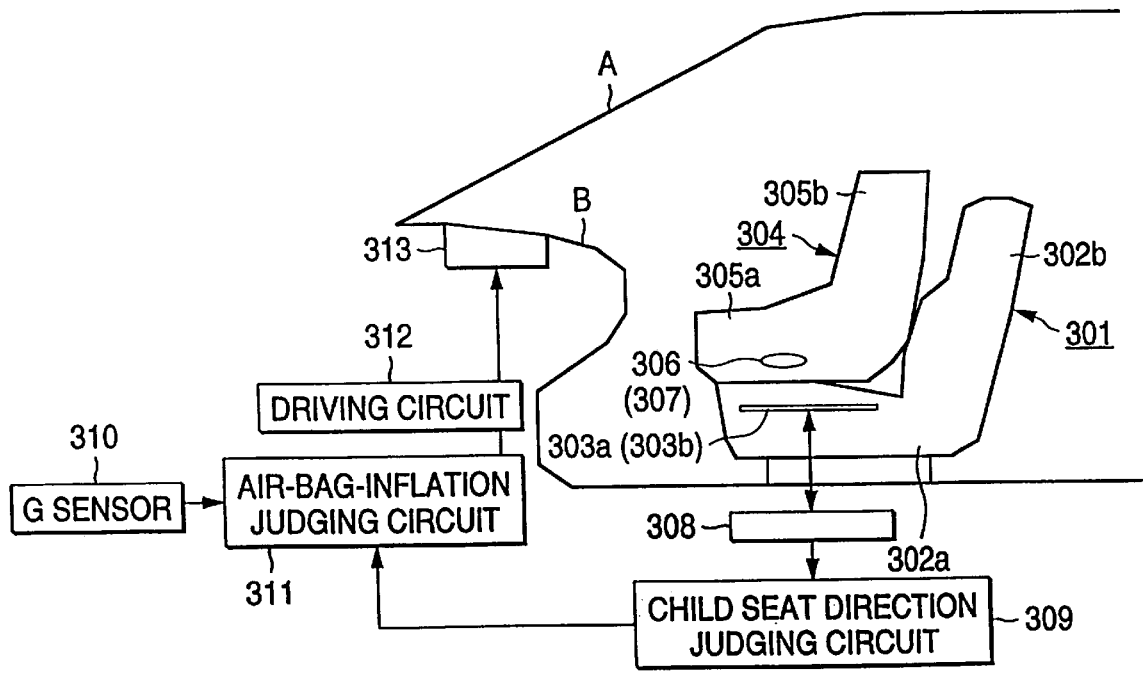
FIG. 24 is a diagram illustrating the auxiliary seat of FIG. 23 which is forward-turned.

As shown in FIGS. 19–20, further, a buckle switch 321 is provided and when the auxiliary seat 304 such as a child seat is firmly secured to the seat 301 by a seat belt in order to prevent the auxiliary meat 304 from drifting away because of an impact applied thereto, the switch is turned on and a fitting signal is supplied to the auxiliary-mounting-direction decision circuit 309. When the fitting signal is supplied, the auxiliary-mounting-direction decision circuit 309 determines that the auxiliary seat 304 is forward-turned and sets an out-of-position warning lamp in a non-lighting state.

Although an permit signal is supplied to the air-bag-inflation decision circuit 11 at this time, no permit signal is output when a non-fitting signal is supplied.

Also, the antenna 320 and the code generators 306, 307 may be embedded at the time of shipping from a seat manufacturing maker, or may be provided later by a dealer.
(Embodiment 4)

Figure 25:
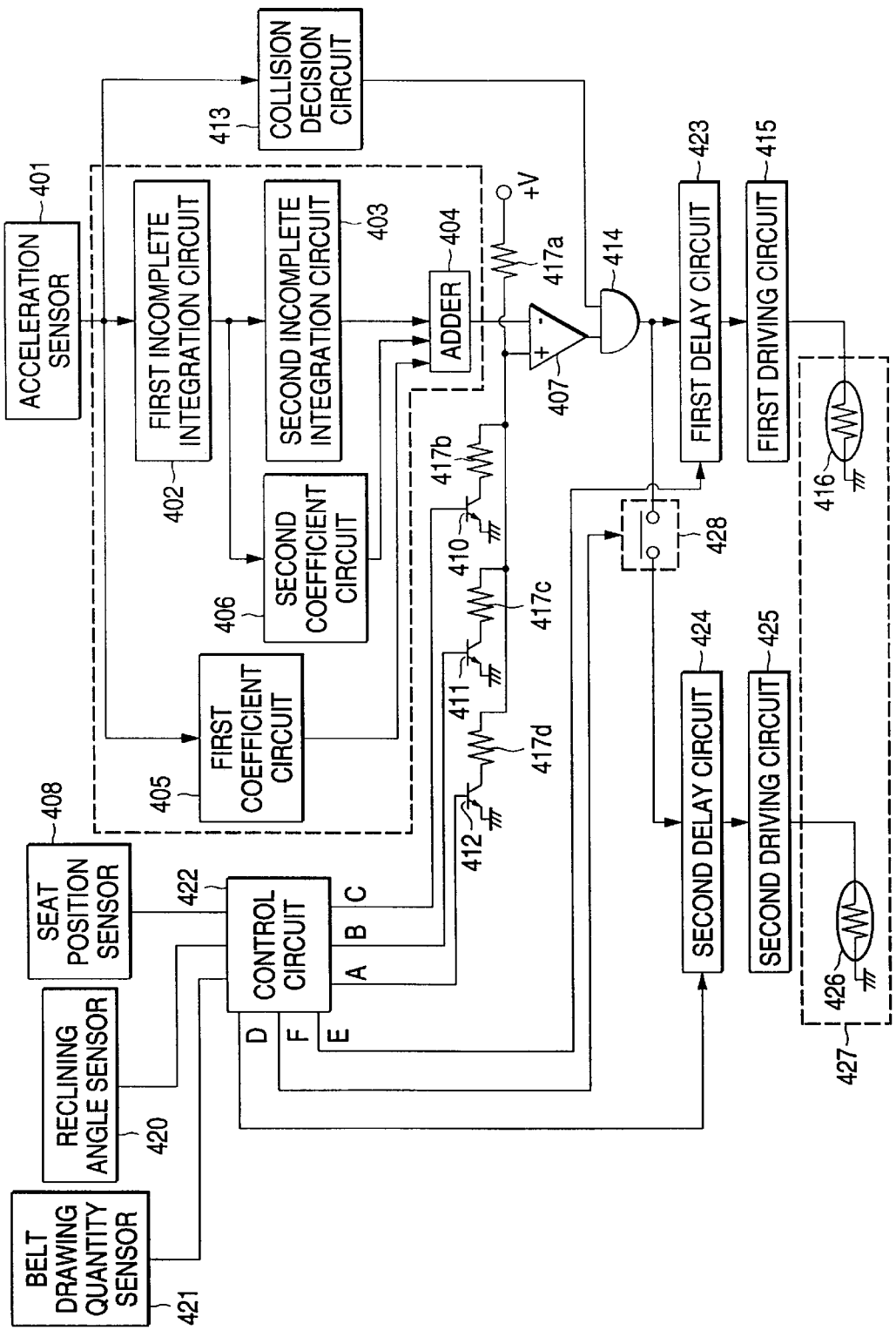
FIG. 25 is a circuit diagram illustrating an embodiment of the present invention.

Referring to FIGS. 25–26, there is illustrated an embodiment of the present invention.

Figure 27:
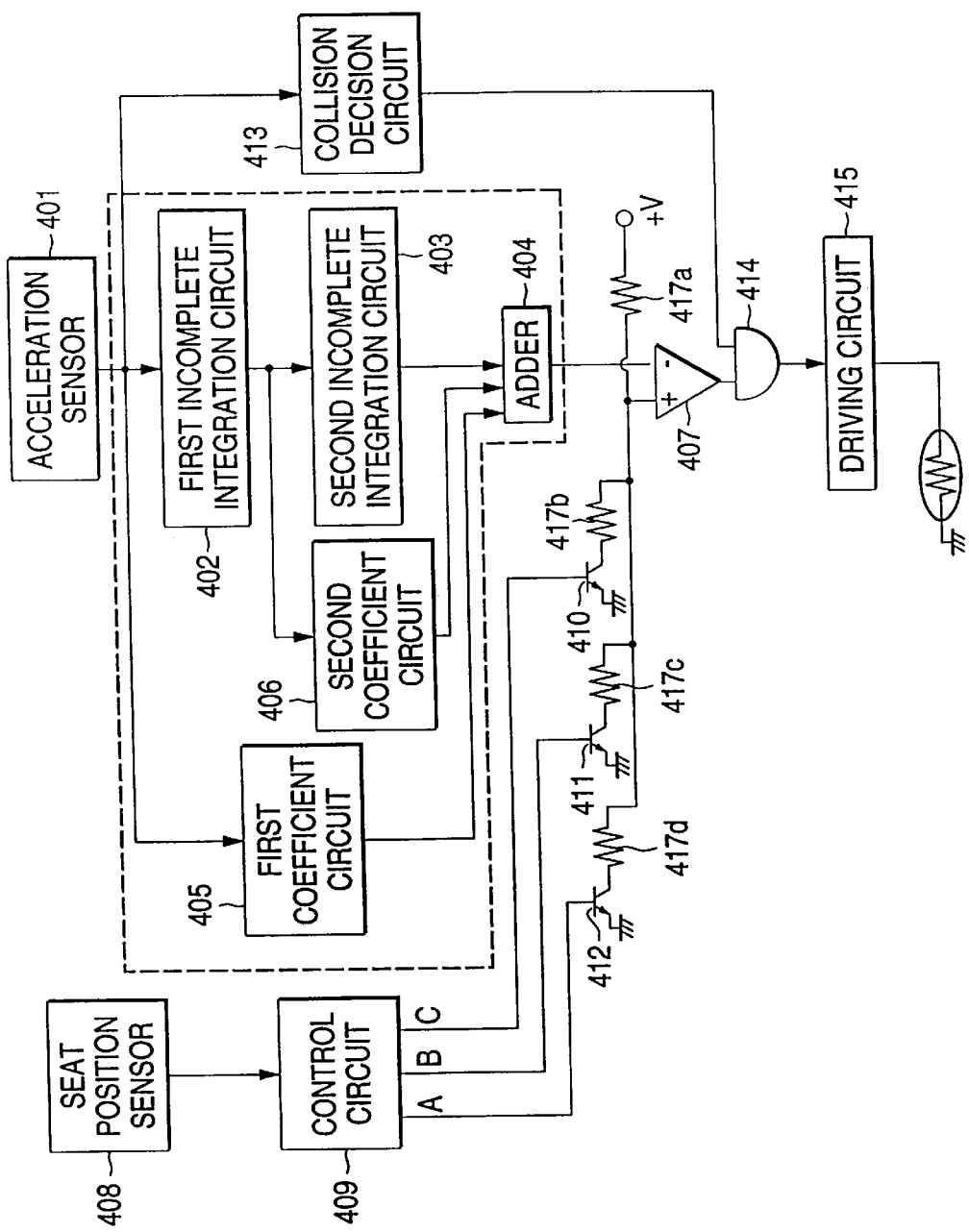
FIG. 27 is a diagram illustrating a conventional circuit.

In FIG. 25, like reference characters designate like or equivalent parts described in the arrangement shown in FIG. 27 with the omission of the detailed description thereof.

Reference numeral 420 denotes a reclining angle sensor for detecting the reclining angle of a passenger seat, and supplying to control circuit 422 an angle signal resulting from the detection; and 421, a seat-belt drawing quantity sensor 421 for supplying to the control circuit 422 a drawing quantity signal proportional to a seat-belt drawing quantity. The control circuit 422 selectively switches output terminals A–F over the logical state shown in FIG. 426 according to signals from the seat position sensor 408, the reclining angle sensor 20 and the seat-belt drawing quantity sensor 421.

Reference numeral 423 denotes a first delay circuit which is installed between the output terminal of the AND gate 414 and the first driving circuit 415 and operates to switch delay time from 0 to T1 at the time of, for example, a high level ("1") based on logic from the output terminal E of the control circuit 422; 424, a second delay circuit which is installed between the output terminal of the AND gate 414 and a second driving circuit 425 via a switch circuit 428, which will be described later, and operates to switch delay time from 0 to T2 (<T1) at the time of, for example, the high level based on logic from the output terminal D of the control circuit 422; 426, a detonator 426 which is together-with the detonator 416 provided in one inflator 427. The inflator 427 of this kind is the same one disclosed in, for example, Japanese Utility Model No. 3029326, and ignited on receiving a trigger signal from the second delay circuit 424 via the second driving circuit 425.

The switch circuit 428 is installed between the output terminal of the AND gate 414 and the second delay circuit 424, and normally held ON on receiving a low level signal ("0") from the output terminal P of the control circuit 422 but turned OFF on receiving the high level signal.

With the arrangement above, the operating conditions of inflation of an air bag are controlled in accordance with contents of air bag control shown in FIG. 26.

(1) Control in a section L1 (the head of a person on board within a range of ordinary changes):

As the logical state of the output terminals D–F of the control circuit 422 is 0, that is, at the low level, the delay time T1, T2 of the first and second delay circuits 423, 424 is set to 0, and as the switch circuit 428 is turned on, only the reference value of the comparator 407 is set by the combination of logic of the output terminals A–C of the control circuit 422. Thus, only the ignition timing is varied in accordance with the longitudinal position of the head of the person on board as the reference value is varied by changing the ON-OFF combination. Consequently, both detonators 416, 426 are simultaneously ignited without delay and the inflection rate is high (the expansion force of the air bag is great) when the output of the AND gate 414 is set at the high level and the trigger signal is output because of a collision.

(2) Control in a section L2 (the head of the person on board is slightly closer to the inflator 427 than a normal range of ordinary changes)t As the output terminals A–D of the control circuit 422 are in the high level state with the logical state of the output terminals E, F being at the low level state, the delay time of the first delay circuit 423 is set to 0 and the delay time of the second delay circuit 424 is set to a predetermined value, and as the switch circuit 428 is turned on, the output of the AND gate 414 is set at the high level. Consequently, the delay time is not given to one detonator 416 but the delay time T2 is given to the other detonator 426 which in then ignited when the trigger signal is output as. a result of the collision. Thus, the one detonator 16 is initially ignited and the detonator 26 is ignited T2 time later. Therefore, the inflation rate is so controlled as to become average.

(3) Control in a section L3 (the head of the person on board is slightly closer to the inflator 427 than the range of the section L2):

As the output terminals A–C, E of the control circuit 422 are in the high level state with the logical state of the output terminals D, F being at the low level state, the delay time of the first delay circuit 423 is set to the predetermined value and the delay time of the second delay circuit 424 is set to 0, and as the switch circuit 428 is turned on. Consequently, the delay time is not given to one detonator 426 but the delay time T1 is given to the other detonator 416 which is then ignited when the collision occurs. Thus, one detonator 426 is initially ignited and the detonator 416 is ignited T1 time later. Therefore, the inflation rate in set slightly lower than that in the section L2.

(4) Control in a section L4 (the head of the person on board is slightly closer to the inflator 427 than the range of the section L3):

As the output terminals A–C, F of the control circuit 422 are in the high level state with the logical state of the output terminals D, E being at the low level state, the delay time of the first and second delay circuits 423, 244 is set to 0, and as the switch circuit 428 is turned off. Consequently, the trigger signal is supplied to only the other detonator 416 which is then ignited when the collision occurs and one detonator 426 is not ignited. Therefore, the inflation rate is set extremely lower than that in the section L3.
(Embodiment 5)

Figure 28:
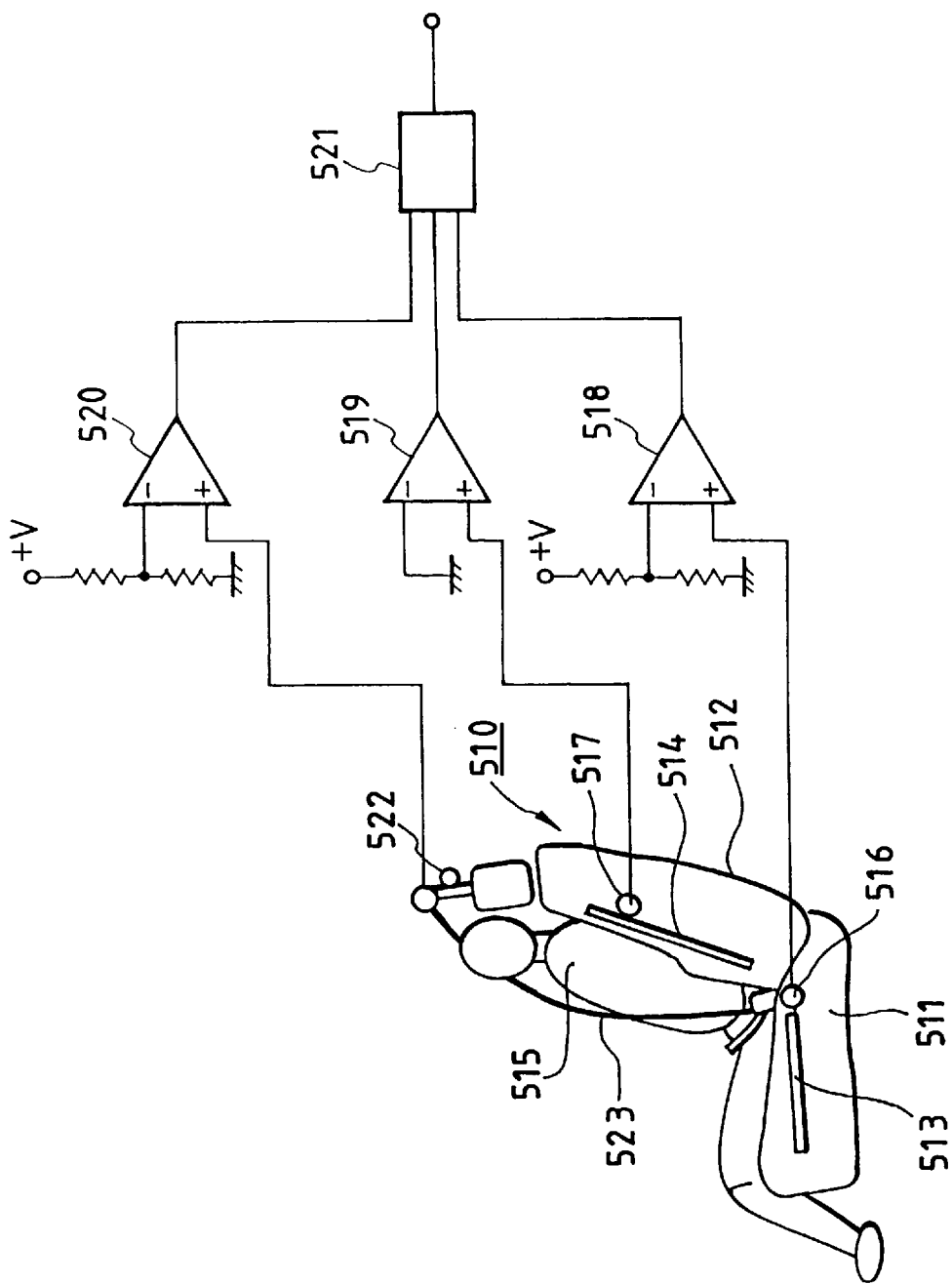
FIG. 28 is a circuit diagram illustrating an embodiment of the present invention.

Referring to FIG. 28, there is illustrated an embodiment of the present invention.

Reference numeral 510 denotes a passenger seat 510 comprising a seating portion 511 and a back portion 512 in combination in which air bags 513, 514 are respectively disposed and used to receive the weight of a person on board 515 sitting thereon. The pressures converted from the weight by the air bags 513, 514 are converted into electric signals respectively by pressure sensors 516, 517 coupled to the air bags 513, 514. The quantity of a seat belt 523 drawn by the person on board 515 who has used the seat belt 523 is converted into an electrical value resulting from multiplying the drawn quantity by a predetermined correcting function so as to calculate the thickness of the body of the person on board and the calculated results are supplied to corresponding first, second and third comparators 518, 519, 520.

The first comparator 518 has a reference voltage equivalent to, for example, 30 Kg as a reference value and the second comparator 519 has a reference voltage equivalent to, for example, 0 Kg as a reference value, and the third comparator 520 has a reference voltage equivalent to, for example, 50 cm as a reference value, each outputting a high level signal when inputs to the first and third comparators S18, 520 exceed the respective reference values. The second comparator 519 outputs the high level signal when the input voltage level is 0 and a low level signal when it is not 0.

Reference numeral 521 denotes a bad posture decision circuit 521 which determines that the person on board 515 is sitting on the seat in a right posture when the high level signal is supplied from the first and third comparators 518, 520 and when the low level signal is supplied from the second comparator 519, and outputs a non-warning high-level signal. When the low level signal is supplied from one of the first and third comparators 518, 520 or when the high level signal is supplied from the second comparator 519, the bad posture decision circuit 521 determines that the person on board 515 is sitting on the seat in a wrong posture, for example, in a atooped posture and outputs a low level warning signal simultaneously with lighting a lamp (not shown).

Figure 29A:
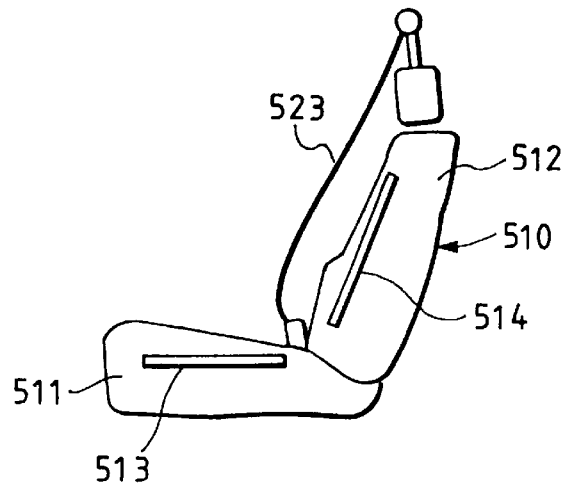
FIGS. 29A to 29C are diagrams illustrating the operation in FIG. 28.

While the person on board 515 is not sitting on the passenger seat 510 as shown in FIG. 29A, the output voltages of the first and second pressure sensors 516, 517 are not raised since the weight of the person on board 515 is not applied to the air bags 513, 514 in the respective seating portion 511 and the back portion 512. Consequently, the outputs of the first and third comparators 518, 520 maintains the low level state, whereas the output of the second comparator 519 maintains the high level state, so that the output of the bad posture decision circuit 521 is maintained in the high level state. Therefore, no warning is issued.

Figure 29B:
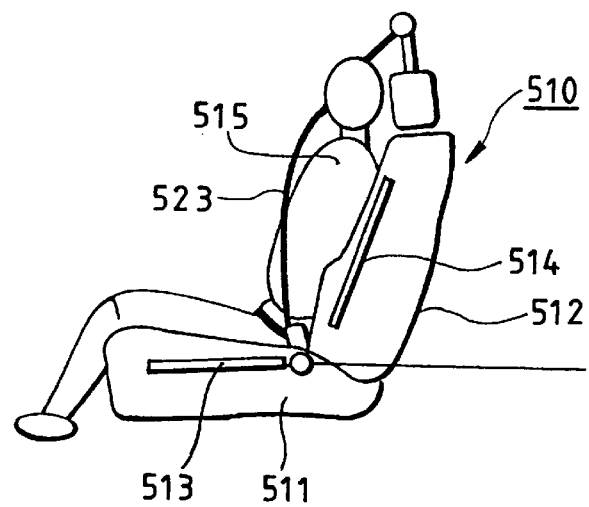

While the person on board 515 is sitting on the passenger seat 510 in a ordinary proper posture as shown in FIG. 29B, the output voltages of the first and second pressure sensors 516, 517 rise to an extent proportional to the urged pressure since the weight of the person on board 515 is divisionally applied to both the air bags in the seating portion 511 and the back portion 512. As the seat belt 523 is also drawn out and used in an ordinary manner, the output voltage of a seat-belt drawn quantity sensor 522 also rises. Consequently, the outputs of the first and the third comparators 518, 520 are put in the high level state, whereas the output of the second comparator 519 is put in the low level state, whereby the output of the bad posture decision circuit S21 is also put in the high level state. Thus, no warning signal is output.

Figure 29C:
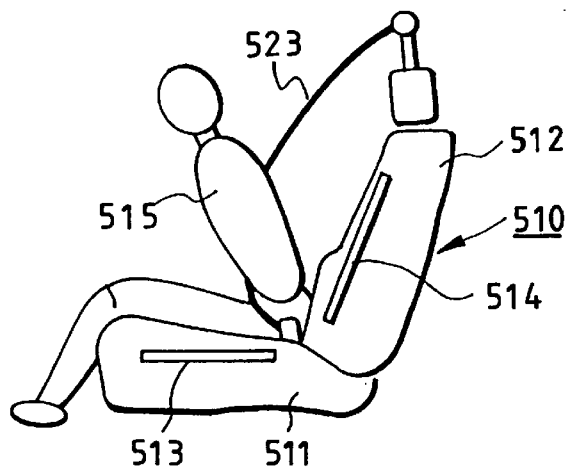
Figure 30:
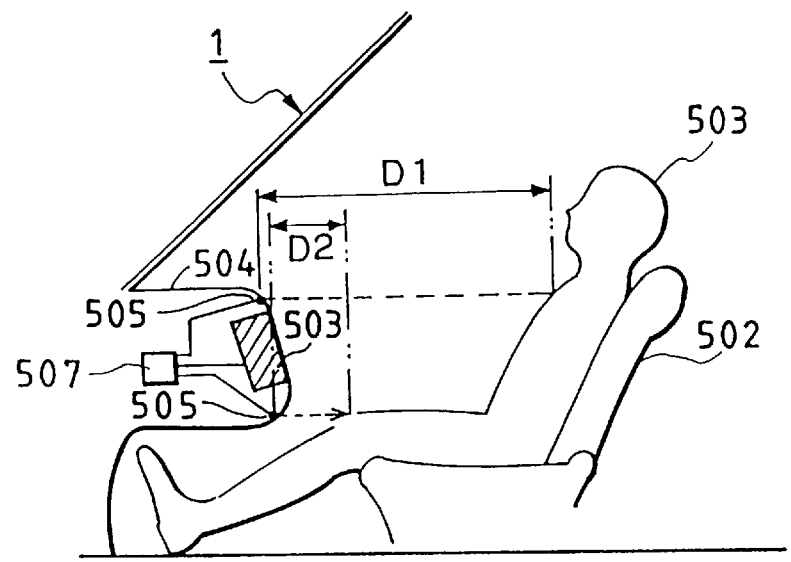
FIG. 30 is a diagram illustrating a conventional example.

As shown in FIG. 29C, further, the weight of the person on board 515 is not applied to the air bag 514 of the back portion 512 though applied to the air bags 513 of the seating portion 511 when the person on board 515 is sitting on the seat in an abnormal posture, for example, in the stooped posture. Therefore, though the output voltage of the first pressure sensor 516 rises to an extent corresponding to the weight of the person on board 515, that is, exceeds the reference value of the first comparator 518, the output voltage of the second pressure sensor 517 does not rises but remains at the 0 level. Since the seat belt is drawn more than necessary, the output voltage of seat-belt drawn quantity sensor 522 also becomes higher than the reference value of the third comparator 520. Consequently, the output of the bad posture decision circuit 521 is also kept at the low level as the output of the second comparator 519 is maintained in the high level state. Therefore, the warning signal is issued and the person on board 515 is urged to sit on the seat in the ordinary proper posture.

In the above embodiment, the sensors 516 and 517 may be provided outside of the seat 510.

(Embodiment 6)

Figure 31:
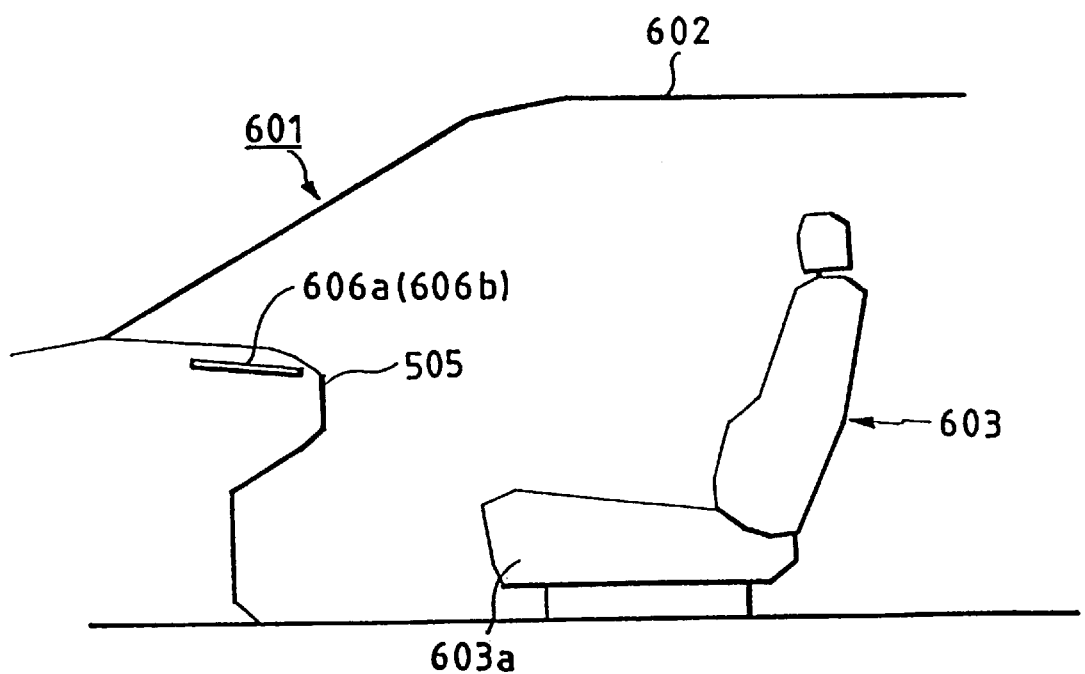
FIG. 31 is a diagram illustrating a first embodiment of the present invention.
Figure 32:
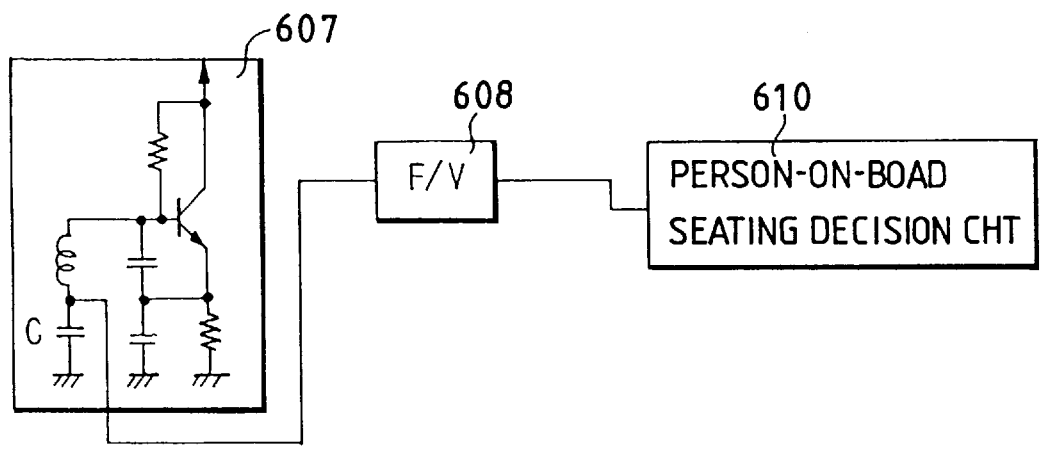
FIG. 32 in a diagram illustrating a circuit connected to the electrostatic capacitance C shown in FIG. 31.

Referring to FIGS. 31–32, there is illustrated an embodiment of the present invention.

Figure 39:
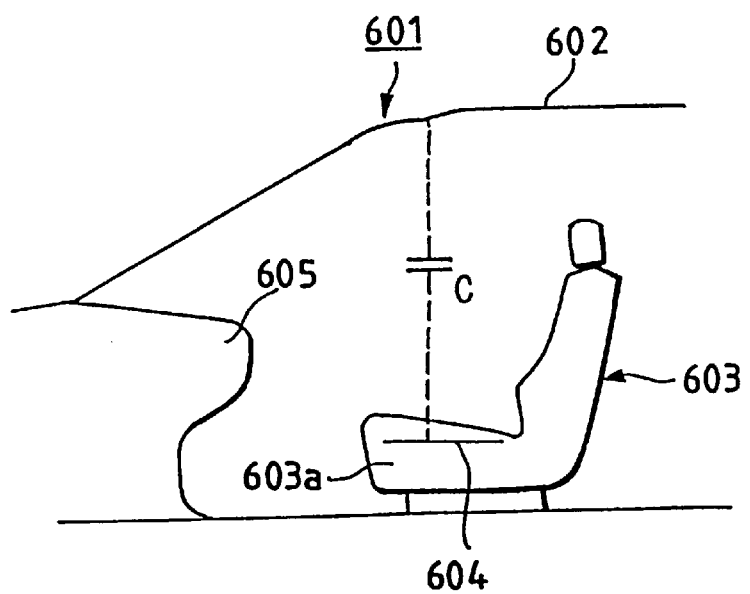
FIG. 39 is a diagram illustrating a conventional example in reference to the present invention.

In FIGS. 31–32, like reference characters designate like or equivalent parts described in the arrangement shown in FIG. 39 with the omission of the description thereof and only those different therefrom will subsequently be described.

As shown in FIGS. 31–32, a pair of electrode plates 606a, 606b are disposed on the top surface side of a vehicular instrument panel 605 on the passenger seat side in parallel to the top surface so that these plates form one and the same plane; thus, electrostatic capacitance C is formed. As the electrostatic capacitance C forms a portion for determining the oscillation frequency of part of a Colpitts oscillating circuit 607, the oscillation frequency varies with the variation of the quantity of the electrostatic capacitance C. The oscillation output of the Colpitts oscillating circuit 607 is supplied to an F/V converter 608 and converted to an output whose voltage value varies in proportion to the frequency. The oscillation frequency of the Colpitts oscillating circuit 607 which is used in this embodiment is a sine wave 300 KHz to 1 MHz in frequency.

Reference numeral 610 denotes a person-on-board seating decision circuit for detecting whether a person on board 611 is standing in front of a passenger seat 603 according to the voltage value supplied from the F/V converter 608. In other words, since the person on board 611 such as a child supports the body by attaching the hands to the top surface of the instrument panel 605 in order to stabilize the body while the child is standing in front of the passenger seat 3 as show in FIG. 33, the person-on-board seating decision circuit 610 decides whether the person on board 611 or the chile is standing by detecting the posture. When the person-on-board seating decision circuit 610 determines that the child is standing, it outputs a signal for causing an air bag on the side of passenger seat 603 not to be inflated.

Figure 33:
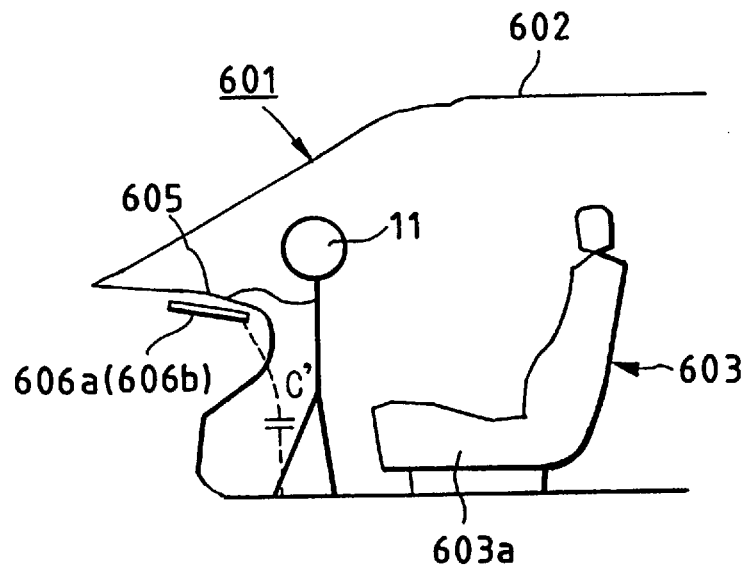
FIG. 33 diagram illustrating Embodiment 1 of FIG. 31 in operation.
Figure 34:
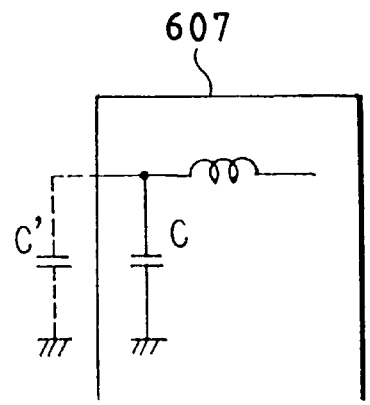
FIG. 34 is a diagram supplementing the operation illustrated in FIG. 33.

When the person on board 611 such as a child stands in front of the passenger seat 603 with the hands attached to the top surface of the instrument panel 605 as shown in FIG. 33 with the arrangement above, part of the body of the person on board 611 enters the electromagnetic field formed between the electrode 606a, 606b of the electrostatic capacitance C and causes the coefficient of electrostatic induction used for determining the electrostatic capacitance C. Therefore, floating capacitance C' in parallel to the original electrostatic capacitance C is generated via the person on board 611 as shown in FIG. 34, and the oscillation frequency of the Colpitts oscillating circuit 607 is changed to a lower level by the use of a sine wave 300 KHz–1 MHz.

Consequently, the person-on-board seating decision circuit 610 determines that the person on board 611 is standing when the voltage becomes lower than a predetermined value because the output voltage of the F/V converter 608 lowers, and outputs a signal for prohibiting the inflation of the air bag. Moreover, the person-on-board seating decision circuit 610 also operates in the same way as mentioned above in a case where the person on board 611 who is an adult, instead of a child, is sitting on the passenger seat 603 and putting the legs on the top surface of the instrument panel 605.

(Embodiment 7)

Figure 35:
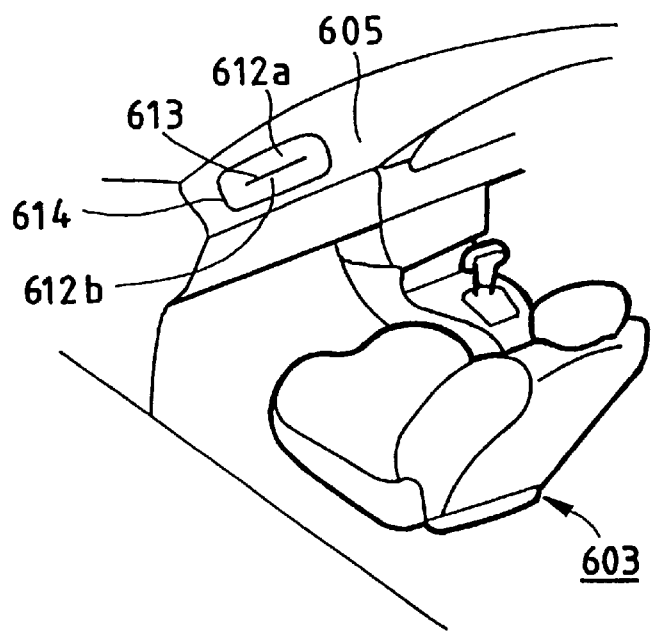
FIG. 35 is a diagram illustrating a second embodiment of the present invention.
Figure 36:
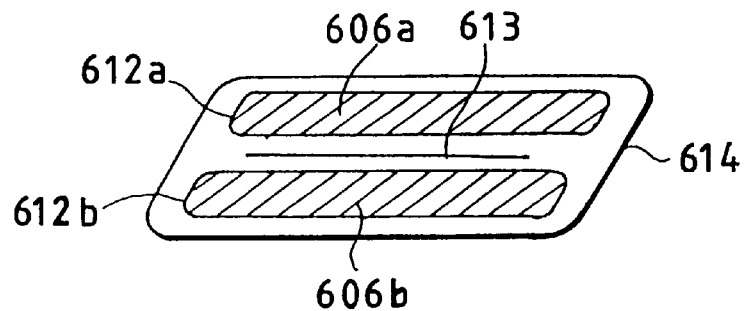
FIG. 36 is an enlarged view of the principal part of FIG. 35.

Referring to FIGS. 35–36, there is illustrated another embodiment of the present invention.

In FIGS. 35–36, like reference characters designate like or equivalent parts described in the arrangement shown in Embodiment 6 with the omission of the description thereof and only those different therefrom will subsequently be described.

The pair of electrode plates 606a, 606b are provided for protecting a person on board who is sitting on the passenger seat 603, and doors 612 (separately embedded by a predetermined space with a cleavage 613 therebetween and integrally formed) for normally closing an opening 614 through which an air bag for a passenger seat is to inflate.

Figure 37:
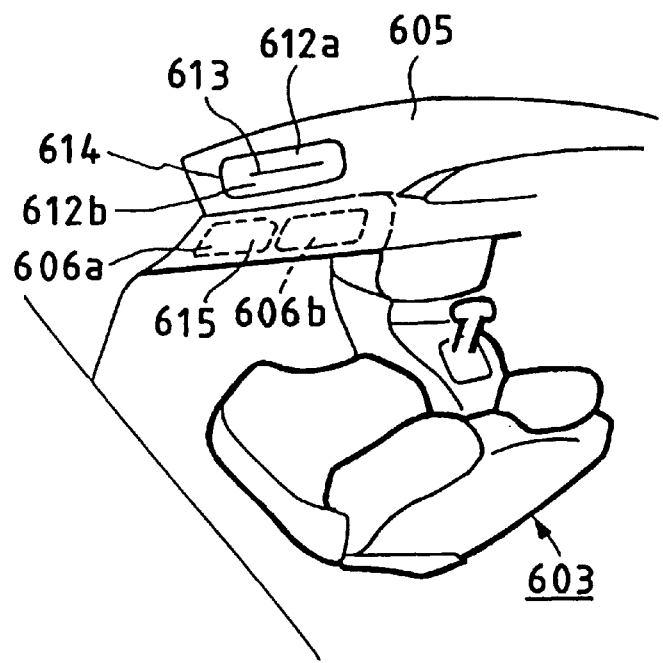
FIG. 37 is a diagram illustrating another embodiment of the present invention.

As shown in FIG. 37, further, a pair of electrode plates 316a, 316b may be embedded in the doors of a glove box in front of the passenger seat 303 on the same plane.

Figure 38:
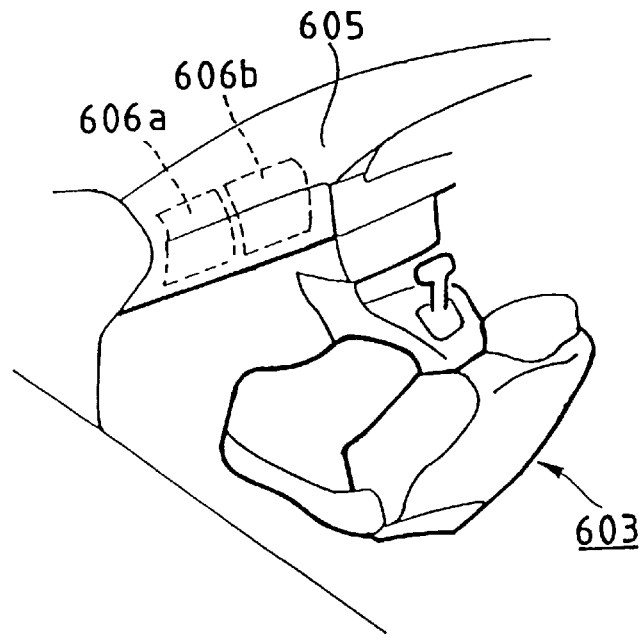
FIG. 38 is a diagram illustrating still another embodiment of the prevent invention.

As shown in FIG. 38, further, the pair of electrode plates 306a, 306b shown in FIG. 37 may needless to say be extended upward, that is, up to the top surface of the instrument panel 305.

As set forth above, according to the first aspect of the invention, there has the effect of making it possible to prepare for measurement while the seat is not used by regulating the internal pressure in the air bag, using the air-pressure regulating means so as to increase measuring precision.

Also, there has the effect of making it possible to replenish the unused seat with air pressure, simply using the air bag installed in another adjoining seat.

Further, there has the effect of simplifying electric wiring without using a motor or the like as the air is replenished with the oscillation of the seat as a driving sources.

Still further, there has the effect of simplifying electric wiring without using a motor or the like as the air is replenished with the oscillation of the seat by utilizing the vertical oscillation of the driver's seat generated at any time during traveling.

According to the second aspect of the present invention, there has the effect of obtaining a weight signal with desired accuracy by correcting the signals from the seat portion and back portion of the seat are corrected with the reclining angle and using the corrected signals.

Further, the present invention has the effect of reducing cost and making the apparatus for detecting the weight of a person sitting on a seat hardly damageable and easy to handle by utilizing the plurality of simple air bags for the pressure sensor.

The present invention has the effect of facilitating the installation of the apparatus for detecting the weight of a person sitting on a seat only by inserting the air bag between the S-springs and the elastic member for forming the surface of the seat or between the elastic member for forming the surface of the seat and the seat supporting structure.

According to the third aspect of the invention, there is provided the apparatus for detecting an auxiliary-seat mounting direction which is extremely easy to handle as one antenna is used and besides mountable afterward. Thus, the apparatus for detecting an auxiliary-seat mounting direction can be made small-sized and has the effect of reducing production cost.

According to the fourth aspect of the present invention, there has the effect of controlling the expansion rate of the air bag and the ignition timing since the ignition modes of the plurality of detonators of the inflator can be controlled in accordance with the various postures of the person on board.

Also, the invention demonstrates the effect of easily controlling the expansion rate of the air bag according to three kinds of output signals from the longitudinal seat position sensor, the reclining angle sensor and the a eat-belt drawing quantity sensor.

Further, the invention demonstrates the effect of easily controlling the expansion rates of the plurality of detonators of the inflator by the delay means.

Still further, the invention demonstrates the effect of easily regulating the delay time of the delay means according to the control signal based on three kinds of output signals from the longitudinal seat position sensor, the reclining angle sensor and the seat-belt drawing quantity sensor.

According to the fifth aspect of the present invention, there has the effect of warning the person on board to sit on the seat in the proper posture precisely when he/she is sitting thereon improperly.

According to the sixth aspect of the present invention, the apparatus for detecting the presence of a person on board can be installed on the inside or within the instrument panel to ensure that without deteriorating its external appearance, the presence of a standing child is effectively detected.

What is claimed is:

1. A person-on-board protecting apparatus comprising:
    ignition timing estimating means for determining a collision according to an output from an acceleration sensor, estimating an estimated time after the collision at which a head of a person on board reaches a predetermined position, and outputting an ignition signal based on the estimated time,
    expansion rate control means for outputting a control signal for controlling an expansion rate of an air bag according to a head position of the head of the person on board, and
    an inflator having a plurality of detonators,
    wherein ignition modes of the plurality of detonators are controlled according to the ignition signal from the ignition timing estimating means and the control signal from the expansion rate control means.

2. A person-on-board protecting apparatus as claimed in claim 1, wherein the expansion rate control means forms the control signal for controlling the expansion rate of the air bag according to output signals from a longitudinal seat position sensor, a reclining angle sensor, and a seat-belt drawing quantity sensor.

3. A person-on-board protecting apparatus as claimed in claim 1, further comprising delay means for selectively delaying ignition of the plurality of detonators according to the control signal from the expansion rate control means to control the expansion rate of the air bag.

4. A person-on-board protecting apparatus comprising:
    ignition timing estimating circuit that determines a collision according to an output from an acceleration sensor, estimates an estimated time after the collision at which a head of a person on board reaches a predetermined position, and outputs an ignition signal based on the estimated time,
    expansion rate control circuit that outputs a control signal for controlling an expansion rate of an air bag according to a head position of the head of the person on board, and
    an inflator having a plurality of detonators,
    wherein ignition modes of the plurality of detonators are controlled according to the ignition signal from the ignition timing estimating circuit and the control signal from the expansion rate control circuit.

5. A person-on-board protecting apparatus as claimed in claim 4, wherein the expansion rate control circuit forms the control signal for controlling the expansion rate of the air bag according to output signals from a longitudinal seat position sensor, a reclining angle sensor, and a seat-belt drawing quantity sensor.

6. A person-on-board protecting apparatus as claimed in claim 4, further comprising a delay circuit that selectively delays ignition of the plurality of detonators according to the control signal from the expansion rate control circuit to control the expansion rate of the air bag.

7. A person protecting apparatus, which assists in protecting a person traveling in a vehicle in the event of a collision of the vehicle, comprising:
    a moving distance estimating circuit that estimates a moving distance that a head of the person will move during a period of time after the collision and that outputs a corresponding moving distance signal;
    a head distance determining circuit that determines an initial distance between the head of the person and a predetermined position before the collision and that outputs at least one ignition timing signal and at least one inflation rate control signal based on the initial distance;

an ignition signal generating circuit that inputs the moving distance signal and the ignition timing signal and outputs an ignition signal at an ignition time based the ignition timing signal and the moving distance signal; and an inflator circuit comprising a plurality of detonators, wherein the inflator circuit inflates an airbag at the ignition time based on the ignition signal and wherein the inflator circuit selectively detonates the detonators based on the inflation rate control signal to control an inflation rate of the air bag.

8. The apparatus as claimed in claim 7, wherein the head distance determining circuit inputs at least one sensing signal from at least one of a seat-belt drawing quantity sensor that detects an amount of a seat-belt used to secure the person within the vehicle, a reclining angle sensor that detects a reclined angle of a seat in which the person is sitting, and a seat position sensor that detects a longitudinal position of the seat within the vehicle, and wherein the head distance determining circuit determines the initial distance based on the at least one sensing signal.

9. The apparatus as claimed in claim 7, wherein the head distance determining circuit inputs a seat position signal from a seat position sensor that detects a longitudinal position of a seat within the vehicle and inputs an angle signal from a reclining angle sensor that detects a reclined angle of the seat in which the person is sitting, and wherein the head distance determining circuit determines the initial distance based on the seat position signal and the angle signal.

10. The apparatus as claimed in claim 9, wherein the head distance determining circuit inputs a seat-belt signal from a seat-belt drawing quantity sensor that detects an amount of a seat-belt used to secure the person within the vehicle, and wherein the head distance determining circuit determines the initial distance based on the seat-belt signal.

11. The apparatus as claimed in claim 7, wherein the ignition signal generating circuit comprises:

a voltage generating circuit that generates a reference voltage having a reference voltage value based on the ignition signal; and a comparing circuit that inputs the reference voltage and the moving distance signal and outputs the ignition timing signal when the reference voltage value and the value of the moving distance signal have a predetermined relationship.

12. The apparatus as claimed in claim 7, wherein the plurality of detonators comprise a first detonator and a second detonator, and wherein the inflator circuit further comprises:

a first delay circuit, wherein the first delay circuit selectively delays a detonation of the first detonator based on the inflation rate control signal to control the inflation rate of the air bag.

13. The apparatus as claimed in claim 12, wherein the inflation rate control signal does not activate the first delay when the initial distance equals a first distance value such that the first and second detonators detonate substantially simultaneously in response to the ignition signal, and wherein the inflation rate control signal activates the first delay when the initial distance equals a second distance value such that the first delay circuit is activated such that the first detonator detonates after the second detonator.

14. The apparatus as claimed in claim 13, wherein the second distance value is less than the first distance value.

15. The apparatus as claimed in claim 7, wherein the plurality of detonators comprise a first detonator and a second detonator, wherein the head distance determining circuit outputs a second inflation rate control signal based on the initial distance, and wherein the inflator circuit further comprises:

a first delay circuit, wherein the first delay circuit selectively delays a detonation of the first detonator based on the inflation rate control signal to control the inflation rate of the air bag; and a second delay circuit, wherein the second delay circuit selectively delays a detonation of the second detonator based on the second inflation rate control signal to control the inflation rate of the air bag.

16. The apparatus as claimed in claim 15, wherein the inflation rate control signal does not activate the first delay and the second inflation rate control signal does not activate the second delay when the initial distance equals a first distance value such that the first and second detonators detonate substantially simultaneously in response to the ignition signal.

17. The apparatus as claimed in claim 16, wherein the inflation rate control signal does not activate the first delay and the second inflation rate control signal activates the second delay when the initial distance equals a second distance value such that the second detonator detonates after the first detonator, wherein the second distance value is less than the first distance value.

18. The apparatus as claimed in claim 17, wherein the head distance determining circuit outputs a third inflation rate control signal based on the initial distance and wherein the apparatus further comprises:

a switch that selectively disables the second detonator in accordance with the third inflation rate control signal.

19. The apparatus as claimed in claim 18, wherein the third inflation rate control signal disables the second delay when the initial distance equals a third distance value such that the only the first detonator detonates after the collision, wherein the third distance value is smaller than the second distance value.

20. The apparatus as claimed in claim 19, wherein the inflation rate control signal activates the first delay and the second inflation rate control signal does not activate the second delay when the initial distance equals a fourth distance value such that the first detonator detonates after the second detonator, wherein the fourth distance value is less than the second distance value and greater than the fourth distance value.

21. The apparatus as claimed in claim 7, wherein the plurality of detonators comprise a first detonator and a second detonator, and wherein the inflator circuit further comprises:

a switch that selectively disables the second detonator in accordance with the inflation rate control signal.

22. The apparatus as claimed in claim 21, wherein the inflation rate control signal does not disable the second detonator when the initial distance equals a first distance value such that the first detonator and the second detonator detonate after a collision, wherein the inflation rate control signal disables the second detonator when the initial distance equals a second distance value such that only the first detonator detonates after the collision, and wherein the second distance value is smaller than the first distance value.

23. The apparatus as claimed in claim 22, wherein the head distance determining circuit outputs a second inflation rate control signal based on the initial distance and wherein the apparatus further comprises:

a first delay circuit, wherein the first delay circuit selectively delays a detonation of the first detonator based on the second inflation rate control signal to control the inflation rate of the air bag, wherein the second inflation rate control signal does not activate the first delay when the initial distance equals the first distance value such that the first and second detonators detonate substantially simultaneously when the ignition signal is output, wherein the second inflation rate control signal activates the first delay when the initial distance equals a third distance value such that the first delay circuit is activated such that the first detonator detonates after the second detonator, and wherein the third distance value is less than the first distance value and is greater than the second distance value.

* * * * *